United States Patent
Perez et al.

(10) Patent No.: US 9,619,943 B2
(45) Date of Patent: *Apr. 11, 2017

(54) EVENT AUGMENTATION WITH REAL-TIME INFORMATION

(71) Applicant: Microsoft Technology Licensing, LLC, Redmond, WA (US)

(72) Inventors: Kathryn Stone Perez, Kirkland, WA (US); John A. Tardif, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/143,862

(22) Filed: May 2, 2016

(65) Prior Publication Data

US 2016/0314625 A1  Oct. 27, 2016

Related U.S. Application Data

(63) Continuation of application No. 13/112,919, filed on May 20, 2011, now Pat. No. 9,330,499.

(51) Int. Cl.
G06T 19/00 (2011.01)
G06F 3/01 (2006.01)

(52) U.S. Cl.
CPC ............ *G06T 19/006* (2013.01); *G06F 3/012* (2013.01); *G06F 3/013* (2013.01); *G06T 2219/004* (2013.01)

(58) Field of Classification Search
CPC ...... G06F 3/012; G06F 3/013; G06F 3/04815; G06F 3/0482; G06F 17/30873; G02B 27/017; G02B 27/0093; G06T 19/006; H04N 21/4316

See application file for complete search history.

(56) References Cited

U.S. PATENT DOCUMENTS

| | | |
|---|---|---|
| 5,717,479 A | 2/1998 | Rickards |
| 6,012,812 A | 1/2000 | Rickards |
| 6,950,531 B2 | 9/2005 | Rickards |
| 7,124,425 B1 | 10/2006 | Anderson et al. |
| 7,133,532 B2 | 11/2006 | Rickards |
| 7,632,187 B1 | 12/2009 | Farley et al. |
| 7,657,920 B2 | 2/2010 | Arseneau et al. |

(Continued)

OTHER PUBLICATIONS

Cosworth, Ben, "FanVision device augments live NFL games with video," gizmag [online], Sep. 10, 2010. Retrieved from the internet on Oct. 11, 2010, URL <http://www.gizmag.com/fanvision-nfl-video/16335/>, 3 pages.

(Continued)

*Primary Examiner* — Haixia Du
(74) *Attorney, Agent, or Firm* — Vierra Magen Marcus LLP

(57) ABSTRACT

A system and method to present a user wearing a head mounted display with supplemental information when viewing a live event. A user wearing an at least partially see-through, head mounted display views the live event while simultaneously receiving information on objects, including people, within the user's field of view, while wearing the head mounted display. The information is presented in a position in the head mounted display which does not interfere with the user's enjoyment of the live event.

15 Claims, 17 Drawing Sheets

(56) References Cited

U.S. PATENT DOCUMENTS

| | | |
|---|---|---|
| 7,744,213 B2 | 6/2010 | Jannard et al. |
| 7,749,081 B1 | 7/2010 | Acres |
| 8,243,973 B2 | 8/2012 | Rickards et al. |
| 2003/0023974 A1 | 1/2003 | Dagtas et al. |
| 2004/0171381 A1 | 9/2004 | Inselberg |
| 2006/0105838 A1 | 5/2006 | Mullen |
| 2006/0189386 A1 | 8/2006 | Rosenberg |
| 2007/0002039 A1* | 1/2007 | Pendleton ............ G06T 7/0061 345/419 |
| 2007/0064311 A1 | 3/2007 | Park |
| 2007/0064611 A1 | 3/2007 | He |
| 2007/0261084 A1 | 11/2007 | Smith et al. |
| 2008/0133336 A1 | 6/2008 | Altman et al. |
| 2010/0050140 A1 | 2/2010 | Chang et al. |
| 2011/0018903 A1 | 1/2011 | Lapstun et al. |
| 2011/0213664 A1 | 9/2011 | Osterhout et al. |
| 2011/0221793 A1 | 9/2011 | King et al. |
| 2012/0026191 A1 | 2/2012 | Aronsson et al. |
| 2012/0050142 A1 | 3/2012 | Border et al. |
| 2012/0050143 A1 | 3/2012 | Border et al. |
| 2012/0092328 A1 | 4/2012 | Flaks et al. |

OTHER PUBLICATIONS

Notice of Allowance and Fees Due mailed Jan. 7, 2016 in U.S. Appl. No. 13/112,919.
Non-Final Rejection mailed Sep. 25, 2014 in U.S. Appl. No. 13/112,919.
Non-Final Rejection mailed May 16, 2013 in U.S. Appl. No. 13/112,919.
Final Rejection mailed Aug. 13, 2015 in U.S. Appl. No. 13/112,919.
Final Rejection mailed Dec. 19, 2013 in U.S. Appl. No. 13/112,919.
Amendment mailed Nov. 12, 2015 in U.S. Appl. No. 13/112,919.
Amendment mailed Dec. 29, 2014 in U.S. Appl. No. 13/112,919.
Amendment mailed Jun. 19, 2014 in U.S. Appl. No. 13/112,919.
Amendment mailed Nov. 18, 2013 in U.S. Appl. No. 13/112,919.

* cited by examiner

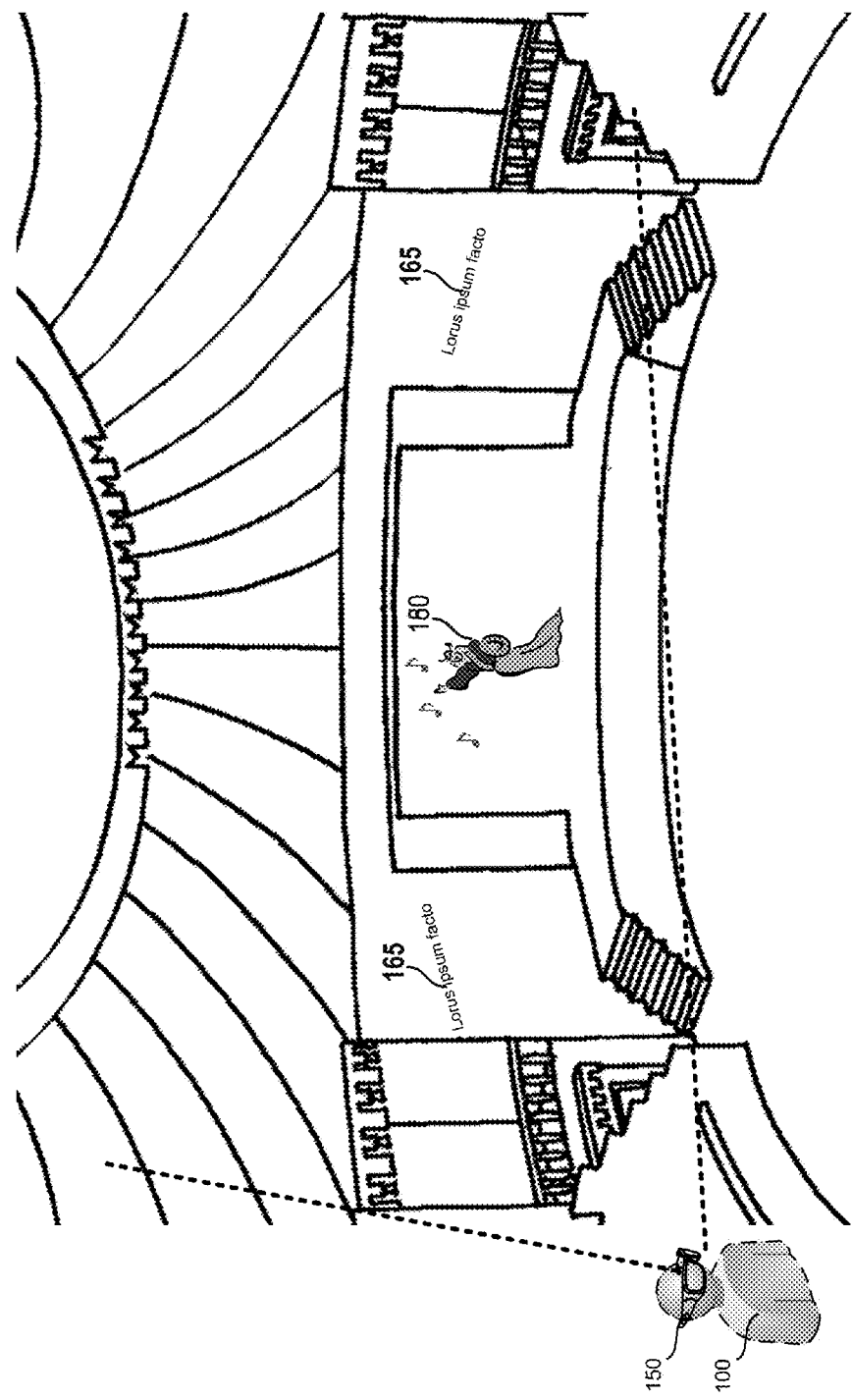

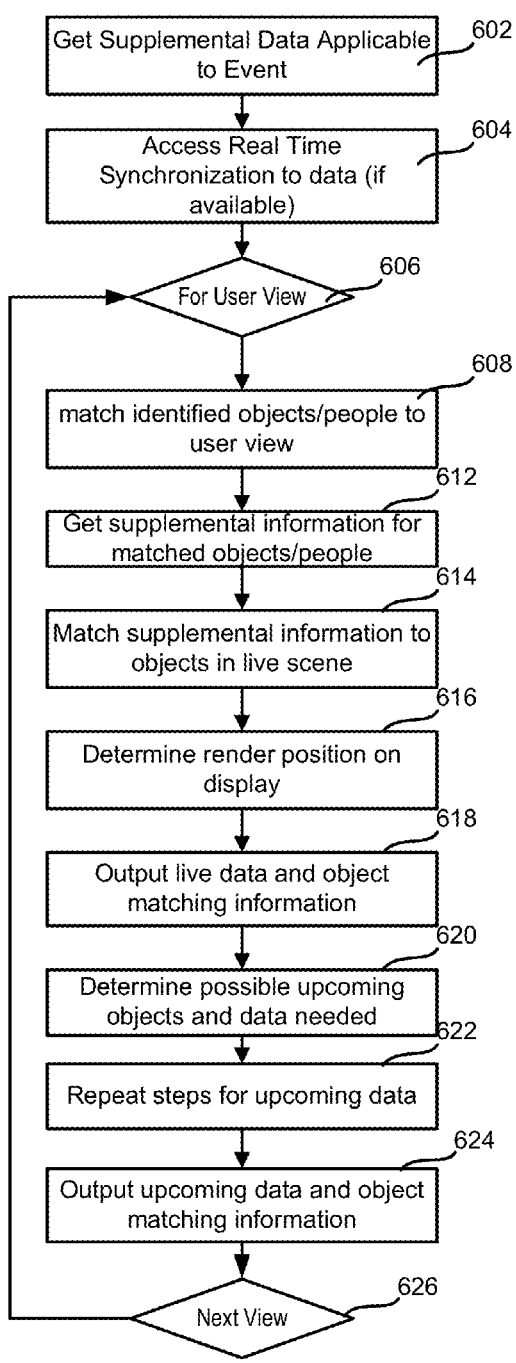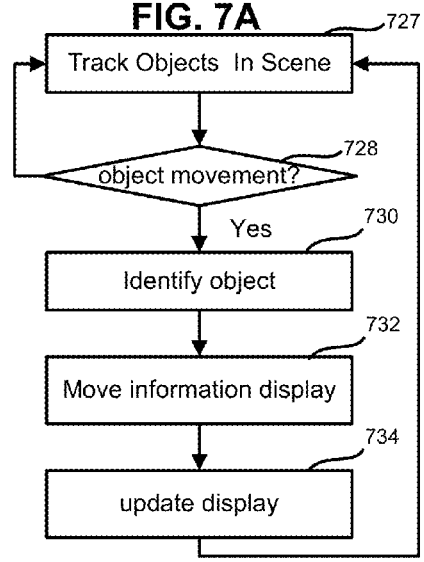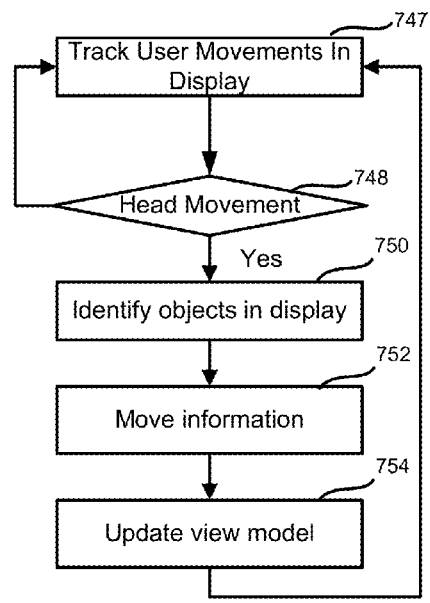

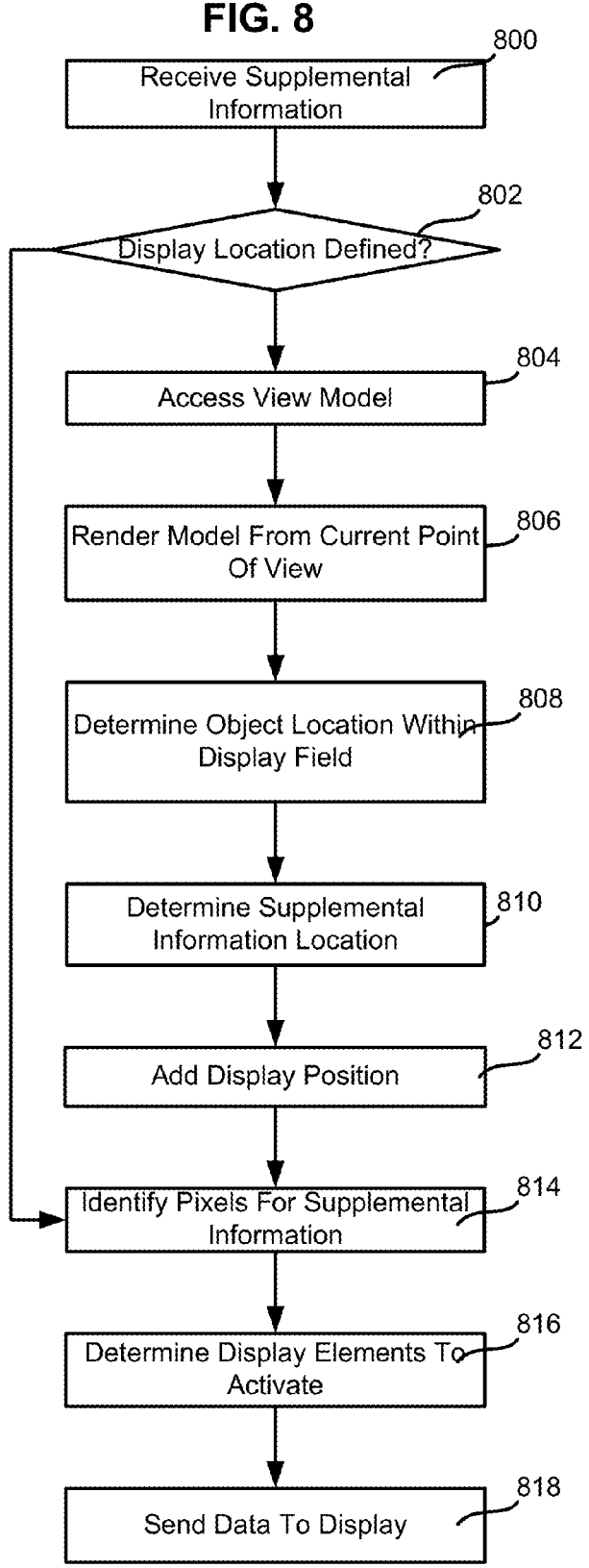

EVENT AUGMENTATION WITH REAL-TIME INFORMATION

CLAIM OF PRIORITY

The present application is a continuation of and claims benefit of U.S. Ser. No. 13/112,919 filed May 20, 2011 and subsequently issued as U.S. Pat. No. 9,330,499 on May 3, 2016, where the disclosure of said application is incorporated herein in its entirety.

BACKGROUND

Fans of live sporting and artistic events have enjoyed various types of information which is provided on different displays to supplement the live event. This supplemental information is provided both when the user is in attendance at the event and when the user views the event on broadcast media. One example of this is the augmentation of football games to display a first down marker superimposed on a playing field in a broadcast television event, and the broadcast of replays both on broadcast television and large displays at the venue of the event.

When attending live events, spectators may be provided with screen displays augmenting the performance. This augmentation can include instant replays and language translation. Such augmentation causes the user to divert their gaze away from the event toward the display device.

SUMMARY

Technology is presented to provide a user wearing a head mounted display with supplemental information when viewing a live event. The information is provided about actions and objects occurring within an event and within the user's field of view. A user wearing an at least partially see-through, head mounted display can view the live event while simultaneously receiving information on objects, including people, within the user's field of view, while wearing the head mounted display. The information is presented in a position in the head mounted display which does not interfere with the user's enjoyment of the live event.

In a further aspect, a computer implemented method providing supplemental information to a user with a head mounted display viewing a live event includes receiving an indication that a user is attending a live event. The user's field of view through the head mounted display is determined and objects within the field of view at the live event identified. Supplemental information describing at least the objects in the field of view of the user during a portion of the live event is retrieved and that information which is to be provided to the user is determined by a human or programmatic means. The supplemental information is displayed in the head mounted device and may change as the user's view changes or objects and actions within the live event change.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2A is an alternative depiction of a user viewing a second live event.

FIG. 6 is a flow chart depicting steps shown in FIG. 6 of mapping real time supplemental information to actions within the live event.

FIG. 7A is a first alternative method for rendering event-relevant information based on the user view and application parameters.

FIG. 7B is a second alternative method for rendering event-relevant information based on the user view and application parameters.

FIG. 8 is a flow chart illustrating a method for rendering event-relevant information based on user view and application parameters.

DETAILED DESCRIPTION

Technology is presented for augmenting a user experience at a live event. An information provider prepares supplemental information regarding actions and objects occurring within an event. A user wearing an at least partially see-through, head mounted display who is attending the event can register their presence at the event and a desire to receive information about the event during the event. Once the live event begins, a user can view the live event while simultaneously receiving information on objects, including people, within the user's field of view, while wearing the head mounted display. The information is presented in a position in the head mounted display which does not interfere with the user's enjoyment of the live event. Various types of live events and supplemental information are supported.

Figure 1A:
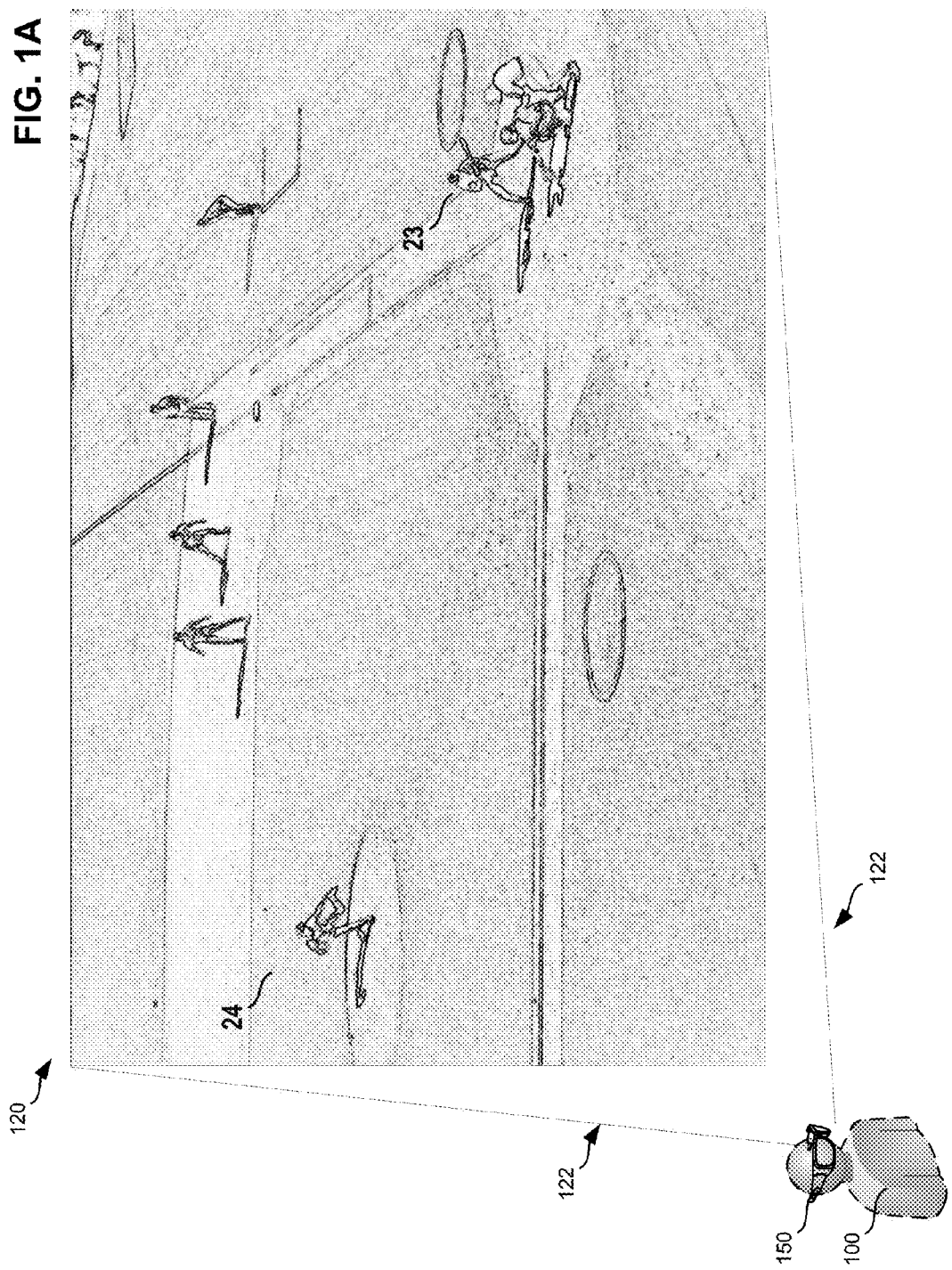
FIG. 1A is a depiction of a user with a head mounted viewing a live event scene.
Figure 1B:
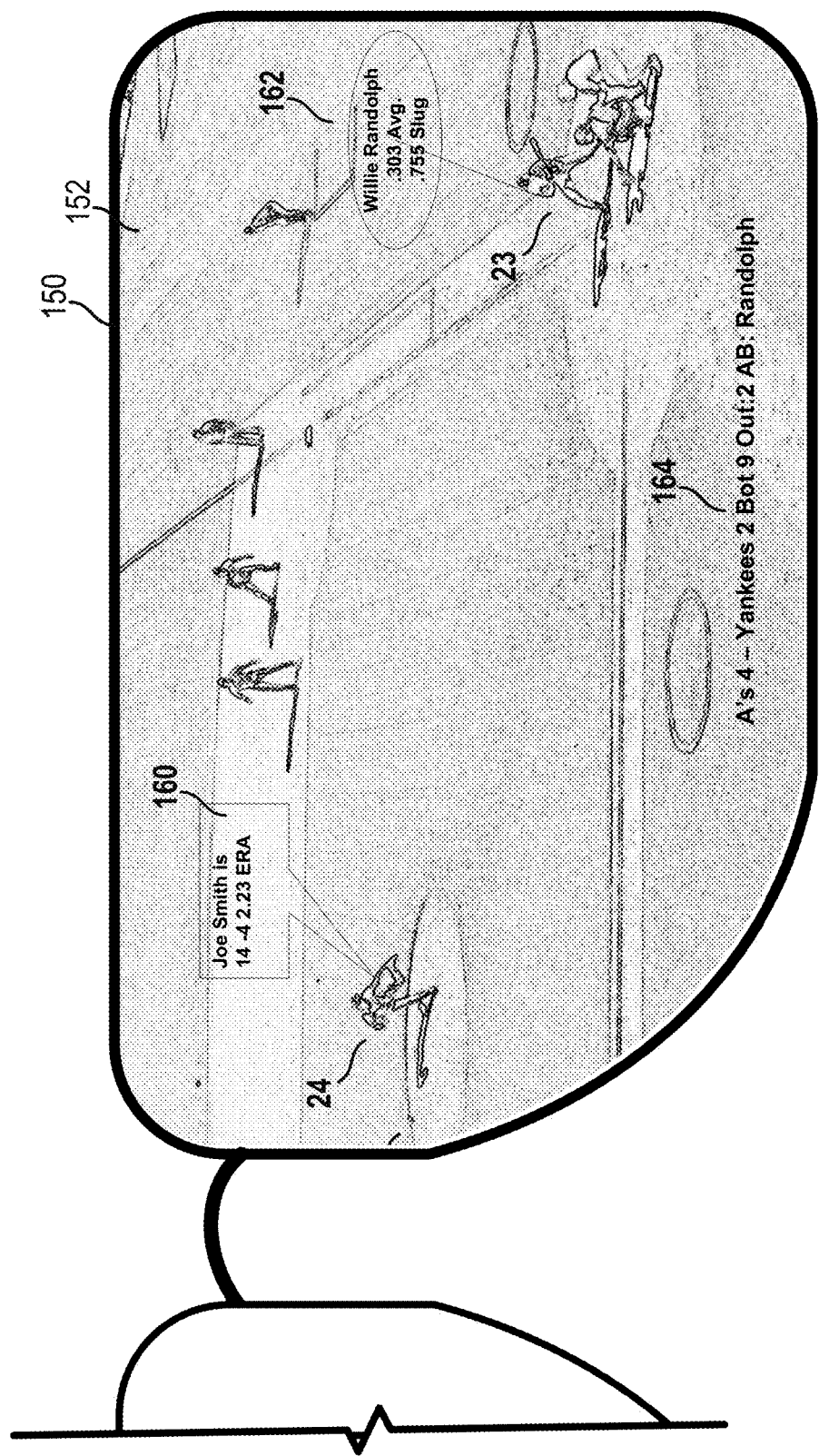
FIG. 1B is a depiction of the live event scene portrayed within a user's head mounted display for the event shown in FIG. 1A.
Figure 1C:
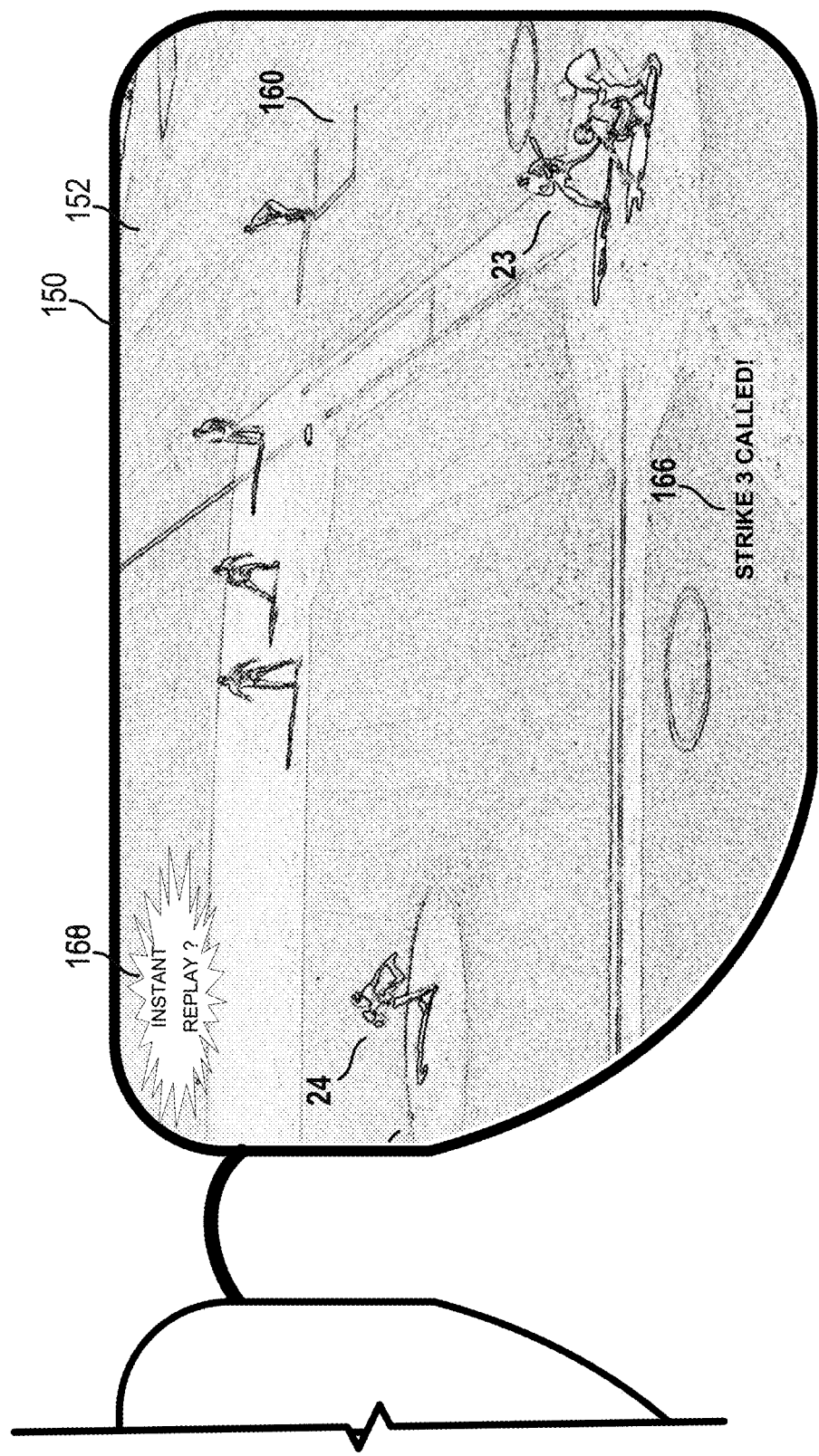
FIG. 1C is an alternative depiction of the live event scene portrayed within a user's head mounted display for event illustrated in FIG. 1A.

FIGS. 1A through 1C illustrate a user 100 wearing a head mounted display device 150 in attendance at and viewing a live event 120. The live event 120, in this example, is a baseball game. Various types of live events are supported within the context of the present technology. A live event is any event that is performed in real time by live actors or participants where the event has a generally prescheduled time and occurs for some event duration. The event duration can be fixed or variable. For example, an opera generally has a fixed duration, while a baseball game plays out until the game completes in accordance with the rules.

The user 100 has a field of view 122 as shown in FIG. 1A. The field of view 122 is based on the user's perspective from, for example, a seat in a baseball stadium. Within the field of view 122 are various objects, such as people, lines, bases, the bat and the ball, and actions which occur, such has throwing, running, hits, runs, steals and other elements of the game. For example, in FIG. 1A, the pitcher 24 has just completed a pitch to a batter 23. All the objects and actions within the field of view of a user comprise a scene. Scenes generally change over time.

A user 100 will attend a live event by generally being in a location where the user is able to view the event from one or more different perspectives. During the event, the user may change the location within the stadium or theater where the event is performed, and is also likely to move their head in three dimensional space, as well as move their eye gaze relative to their head to view various points on the head mounted display. The present technology utilizes various techniques to track the user's location, the user's head position and orientation, and gaze, to determine the user's field of view, in order to present the user with supplemental information regarding the live event at which the user is in attendance.

In FIG. 1A, the user viewing an event 120 would see the players and the field. User 100 is wearing a head mounted display device 150. The head mounted display is transparent or at least semi-transparent, with the capability to overlay information in a display field 152 though which a user views the live event. Examples of a head mounted display suitable for use in accordance with the present technology are discussed below. The examples of the head mounted display herein are capable of generating display elements on various portions of a user's display while remaining portions of the head mounted display are transparent to allow the user to continue to view events or occurrences within the live event during the course of the event duration. Other alternatives allow the display to become complete opaque, in order for the display to provide, for example, a display of a video such as an instant replay of the live event.

FIGS. 1B and 1C illustrate supplemental information in the form of display elements which might be provided to the user 100. FIG. 1B is a partial view of the display field 152 of one lens of a head mounted display such as that shown in FIG. 1A. In FIG. 1B, supplemental information display elements 160, 162 and 164 is provided regarding the game in progress. Within a display device 150, a first display element of supplemental information 160 provides information regarding the pitcher 24. This indicates that the pitcher "Joe Smith" has a record of 14 wins and 900 losses, and a 2.23 earned run average (ERA). Display element 162 provides supplemental information regarding the batter 23. The display element 162 illustrates that the batter's name is Willie Randolph, that the batter has a 0.303 batting average, and a 0.755 slugging percentage. Display element 164 positioned at the bottom of the display indicates the score of the game. Various types of indicators and various types of supplemental information may be provided within the course of a live event. Each display element may contain all or a subset of information regarding the object.

The supplemental information displayed within a particular scene may change over the course of a scene in accordance with the action on the field or theater, or with the interaction of the objects (people) on the field. Likewise, supplemental information displayed may change as the scene changes due to user movement or a change in the user's head position.

As used herein, an object is anything within a live event, including people, which affects the live event or about which supplemental information may be provided. As such, players within the live event 120 are considered objects. Props in a play, game equipment, scoreboards, displays, clothing, etc.—anything about which supplemental information may be provided—can be considered objects. Objects may be identified by the technology and used to determine actions within the live event, and the types of supplemental information which could be provided to a user.

In the examples shown in FIGS. 1A through 1C, one series of actions could be that the pitcher 24 has just thrown a ball to the batter 23, the catcher caught the ball and the umpire called strike three, resulting in an out. One alternative depiction of information which might be provided to the user is shown in FIG. 1C. In FIG. 1C, indicator 166 illustrates that strike 3 has just been called on batter 23. A second display element 168 also provides an opportunity for the user 100 to have an instant replay shown within the head mounted display device 150. The instant replay display element 168 is provided in one part of the display device 150. Display element 168 is an example of user activated supplemental input which may be enabled or selected by a user during the event.

The user can activate the instant replay through one or more different input means. For example, the user may have a supplemental physical switch on the head mounted display, on a processor associated with the head mounted display, or another device associated with the display device 150 which is capable of signaling the information provider (discussed below) to start a head mounted display instant replay within the user's head mounted display. Alternatively, gaze tracking mechanisms within the head mounted display can be activated by a user simply staring at the instant replay display element 168 for some predefined period of time.

Figure 2B:
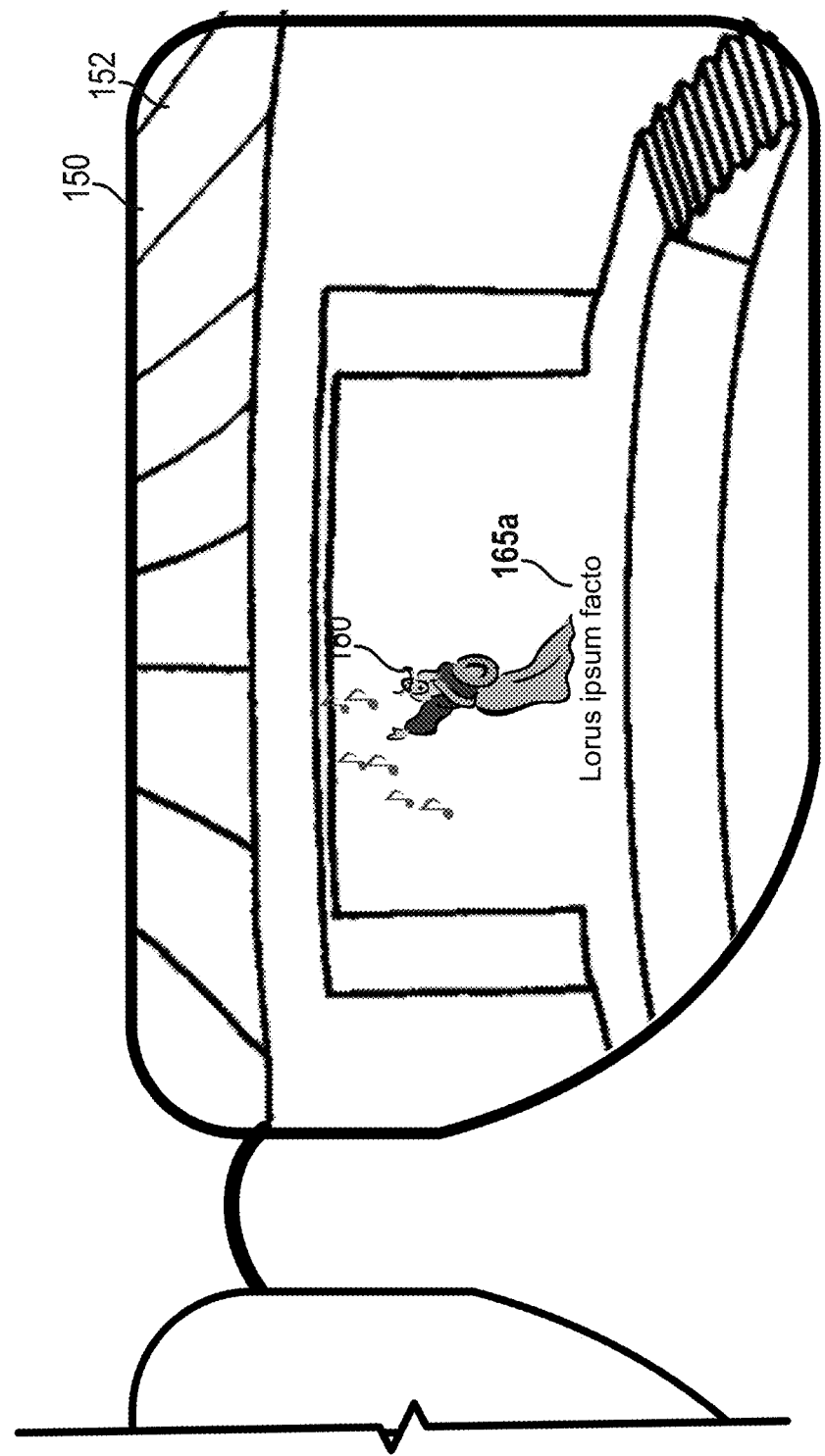
FIG. 2B is a depiction of the user's display within a head mounted display for the event shown in FIG. 2A.
Figure 2C:
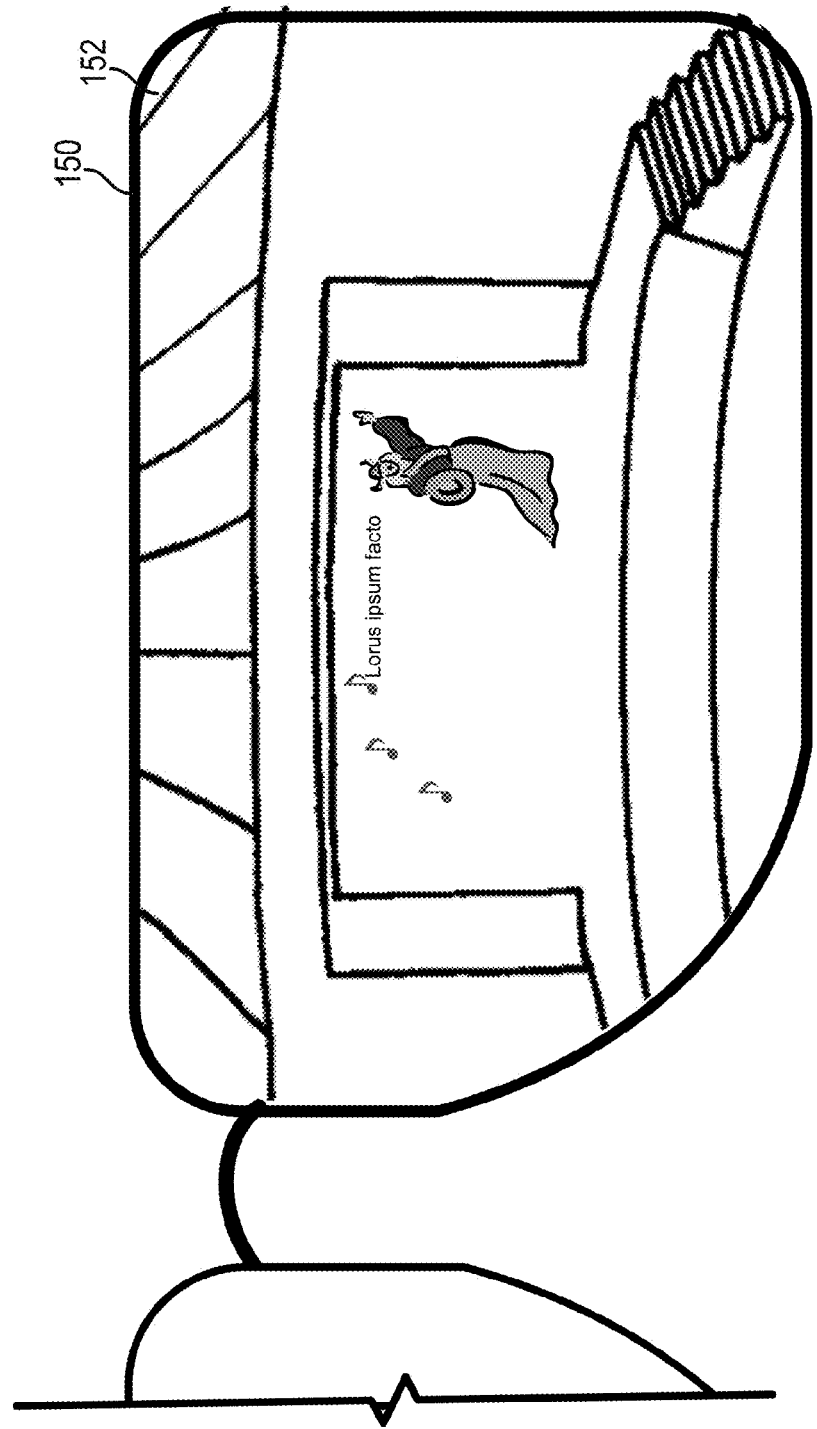
FIG. 2C is an alternative depiction of the user's display for the event shown in FIG. 2A.

As noted above, various types of live events may be provided. FIG. 2A illustrates a user 100 with a head mounted display device 150 viewing a scene 125 of an opera. In the opera, a singer 180 would generally be performing on a stage, with translations of the lyrics of the opera presented in display areas 165 of the opera house. The display of lyrics in display area 165 in this manner is generally distracting to the performance of the singer. This is because a view of the opera will need to look first at the singer 180 and then at the display area 165, alternating back and forth between the two during the performance. FIG. 2B illustrates the display device 150 utilizing the present technology. In this case, the translation 165A is provided in a location within the display field 152 which is more conducive to a user maintaining their view on the singer 180. It may be noted that the position of the display area 165A can move, as illustrated in FIG. 2C both with movement of the singer 180, and with changes in the occurrences within the live event. For example, in FIG. 2C the singer has moved from center stage to stage left. In alternative embodiments, the stage may become more crowded with other performers, props, and the like, and the position of the translation in the opera scene may be moved to yet a different location optimized for the type of events which occur within the scene.

Placement of information within the display field 152 may be dependent on the application design, the type of information presented, the type of live event, the size of the objects within the display and other factors Also, the objects' proximal relation to the user may give rise to the type of supplemental information provided, and the position of the supplemental information provided on the display.

As noted above, there are various types of events and various types of supplemental information for each type of event. The context of the event defines whether the occurrences within the event will occur within a specific order and have a specific set of information. As such, the type of supplemental information which may be provided can be presented in a scripted fashion for scripted events. For semi-random events, a set of supplemental information may be established and information provided based on programmed rules or under the control of a human director. Scripted events follow a generally known plan, while sporting events follow a more random set of occurrences. In an opera, the script of the opera is known in advance. In a baseball game or other type of sporting event, information regarding the players may not occur in a sequential order. Even in semi-random live events, there may be defined rules types of sequences will be known, for example, a batting order or a playing order within the baseball game. Other types of information can be gleaned from actions which occur within the event and which are traceable to other data sets. For example, a hit or strike out within a baseball game can be tied to a person in the batting order and input received from third party data sources tracking events in the game. For events such as sporting events when an unstructured presentation is utilized, an application is provided with programmatic rules defining when presentation of supplemental information based on the actions within the event is to occur. For example, if a home run is hit by a batter, a statistic related to the batter's slugging percentage, or home run total during the year, can be provided.

Programmatic rules can also be provided for scripted events as well, tying the supplemental information to temporal, audio or visual cues, to user preferences or other criteria.

User control may be provided for supplemental information whether the event is scripted or semi-random. For example, users can select between different types and amounts of supplemental information to be displayed, the frequency of the display, and other preferences.

A human director may also direct the provision of supplemental information for scripted events.

It may be understood that there may be multiple types of supplemental information associated with one object or action. For example, a player in a baseball game has any number of statistics associated with the player. Each display element may contain one or more of these statistics. As such, for the set of supplemental information available for one object or one scene, the set, or a sub-set of such information, may be provided in display elements within the display field.

Figure 3:
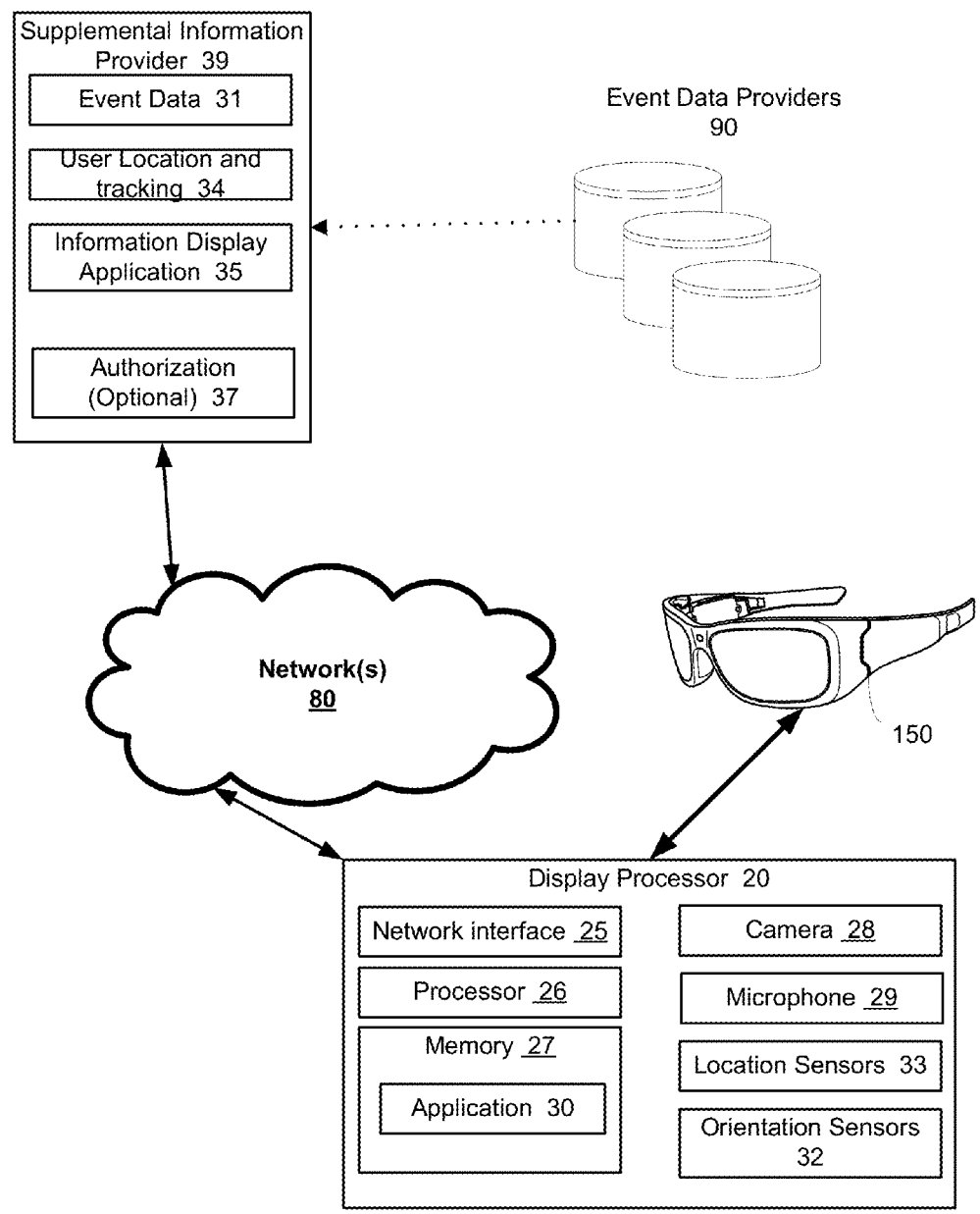
FIG. 3 is a block diagram of a system for implementing the present technology.

FIG. 3 illustrates a block diagram of a system for implementing the present technology. A head mounted display device 150 will be coupled to a display processor 20. The display processor may include a network interface 25, a processor 26, memory 27, a camera input 28, a microphone input 29, location sensors input 33, and/or orientation sensors input 32. A supplemental information presentation application 30 may be present within the memory 27 of the display processor. The display processor will be coupled to the head mounted display device 150 through any of the number of various means, as described below. The display processor 20 interacts with a network 80, such as the Internet, using network interface 25 to couple the head mounted display device 150 to a supplemental information provider 39. The supplemental information provider may itself create and provide supplemental event data, or may provide services which transmit event data from third party event data providers 90 to a user's head mounted display. Multiple supplemental information providers and third party event data providers may be utilized with the present technology. Processor 26 may execute programmatic instructions to implement the application 30 and other services described herein. Display processor 20 may comprise any of the examples of processing devices described herein. Camera input 28 and microphone input 29 provide visual and sound information to the supplemental information provider and application 30. Camera input 28 may receive image and video data from display device 150 which may include a forward facing camera, an eye facing camera or both. Microphone input may receive audio from a microphone on the display device 150 or on a processing device associated with the display. Location sensors may be provided on the display device 150 or a processing device associated with the user and the display. Orientation sensors input receive information from one or more of accelerometers, gyroscopes and magnetometers on the display device 150, the data from which can be used to measure the head position of a user.

A supplemental information provider 39 will include data storage for supplemental live event information 31, user location and tracking data 34, information display applications 35, and an authorization component 37. Event supplemental information 31 includes the supplemental event data for one or more live events for which the service is utilized. As discussed above, the live event data can include supplemental information about one or more live events known to occur within specific periods. User location and tracking module 34 keeps track of various users which are utilizing the system of the present technology. Users can be identified by unique user identifiers, location and other elements. An information display application 36 allows customization of both the type of display information to be provided to users and the manner in which it is displayed. The information display application 35 can be utilized in conjunction with the information display application 30 on the display processor. In one embodiment, the display processing occurs at the information provider 39. In alternative embodiments, information is provided to the display processor 20, and the application 30 on the display processor determines which information should be provided to the display device 150 and where, within the display, the information should be located.

Third party supplemental information providers 90 can provide various types of data for various types of events, as discussed above.

Various types of information display applications 30/35 can be utilized in accordance with the present technology. Different applications can be provided for sporting events, theatrical events, and other types of live events. Different providers may provide different applications for the same live event. Applications may be segregated based on the amount of information provided, the amount of interaction allowed or other feature. Applications can provide different types of experiences within the event, and different applications can compete for the ability to provide information to users during the same event. Application processing can be split between the application on the data provider 39 and on the display processor 20. Processor 26 loads the application and follows the instructions which are coded into the application to provide the display information in accordance with the design of the application provider and the information event data provider. Camera input 28, microphone input 29 and orientation sensors input 32 provider different types of information on the position and field of view of a user to the data provider 39. As discussed below, different types of sensors can be provided in the orientation sensor input 32 which provide position and orientation information to the data provider. A camera input 28 provides an indication of the user's field of view and, where two cameras are provided, may provide an indication of the position of a user's eye within the display device.

User location and tracking module 34 receives tracking information including position and orientation information from the display processor and, for each user, creates a model of the user's view that can be used to present supplemental information by the display application 35. The choice of which supplemental information to present to the users for the given live event is based on a human director or the information display application 35 (alone or in conjunction with the information display application 30).

Figure 4:
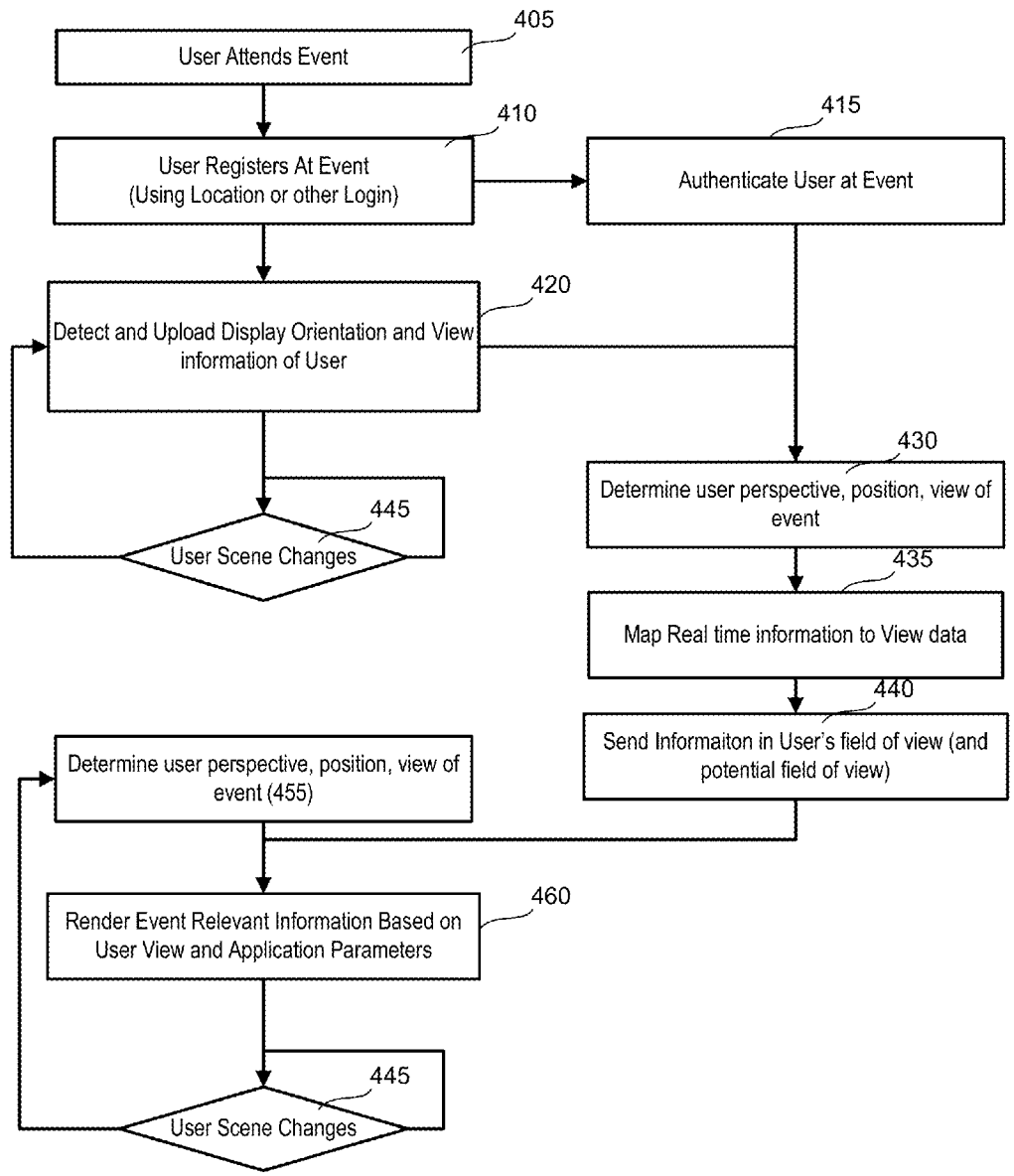
FIG. 4 is a flow chart illustrating a method in accordance with the implementation of the present technology.

FIG. 4 is a flow chart illustrating one embodiment of the method in accordance with the present technology. Elements shown on the left side of the diagram are actions which occur on the processing device 20 and display device 150, while those on the right side are those provided by the supplemental information provider 30. At 405, a user attends a live event. When a user attends a live event, registration of the user at the event at 410 may occur. Registration can occur through physical presence at the event by determining the user's location, or some affirmative action on a part of the user to indicate to a supplemental information provider that the user in attendance at the event and wishes to receive supplemental information. An authentication 415 may be required by the supplemental information provider. An authentication may occur through various numbers of types of mechanisms including the user login or a location check in using a social networking service At 420, user location, display orientation and view information for the user is provided to the supplemental information provider. This is performed in accordance with the sensors provided in the display processor 20 and the display device 150. Position information will be uploaded to the supplemental information provider to allow the supplemental information provider to determine the field of view and type of supplemental information which needs to be provided to the user. When a user changes its their field of view at 445, either due to a physical movement of the user due to rotation, or repositioning of the user's head, or the entire user's body, additional detection and uploading of the display orientation and view information of the user will occur at 420 and may be uploaded to the supplemental information provider in order to allow display application 35 to determine whether an adjustment in the type of supplemental information should occur.

At 430, a determination will be made by the supplemental information provider of the user's perspective, position, and field of view of the live event. Once a determination of the field of view of the user at the event is made, real time supplemental information concerning the event is mapped to objects within the user's field of view. In one embodiment, information is matched to the actual objects which are determined to be within the user's field of view. In another alternative embodiment, objects within the user's field of view as well as objects which may come within the field of view in some future time are mapped at step 435. In this alternative embodiment, information can be downloaded to the display processor to allow the processor to anticipate actions within an event and to more rapidly process supplemental information which needs to be provided for a user.

For example, where a user is in attendance at a baseball game, the batting order is known, and information regarding the next number of batters may be downloaded to the display device since that information will likely need to be provided to the user as the game progresses.

Once the information is mapped to the user's view data, at 440, the supplemental information for objects within the user's field of view is sent to the display device at 440. At 460, the display device renders the supplemental information based on the user view and application parameters. Once again, if the user's position or orientation moves at 445, the processing device 20 can change the rendering of the information within the display device 150 by determining new user perspective, position and view at 455. In this manner, cooperation between the display device 150 and the data provider 30 ensures a seamless display experience for the user.

The supplemental information is provided in real-time as the live event proceeds. Supplemental information display elements may be maintained on the display field 152 for a period of time and then removed, or remain on the field as long as the objects are in the scene. The information can update as actions occur to the object (such as when a batter's count changes in a baseball game). Various types of supplemental information and presentation in display elements may be utilized in accordance with the teachings herein.

Figure 5:
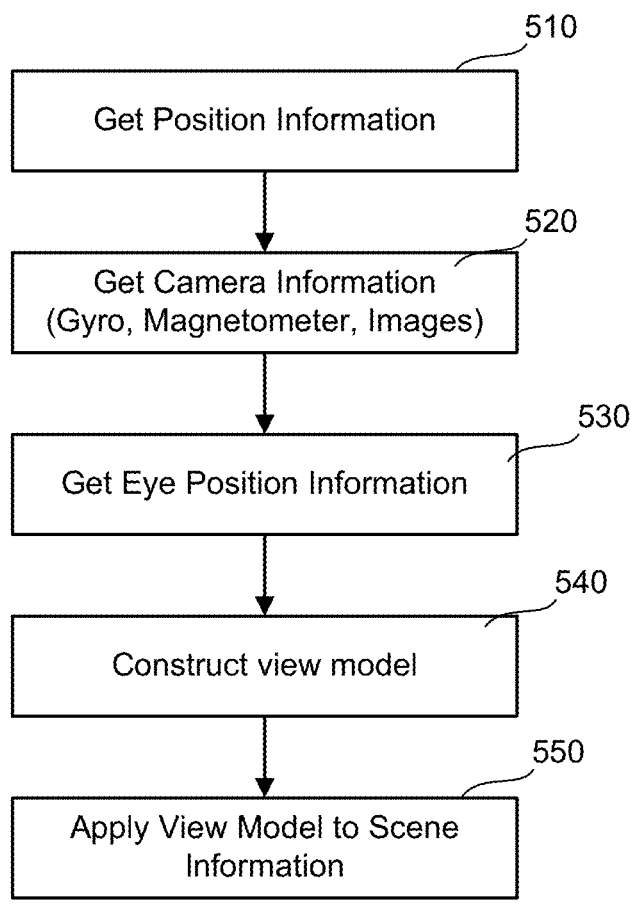
FIG. 5 is a flow chart illustrating a method of determining the user's perspective position and view of a live event.

FIG. 5 illustrates a process for implementing step 430 of determining a user's perspective, position and field of view of an event. At 510, position information is retrieved from the display device 150 and processor 20. Position information can include both the geographical position of the user, the user's head position and orientation, and images of the user's field of view from a forward facing camera on the display device 150. The position information is retrieved at 520 and may include, for example, gyroscope readings, magnetometer readings, and images from the display position.

Optionally, user eye position information is retrieved at 530. In one embodiment, positioning of the supplemental information within the display is dependent on the position of the user's eye. The eye position information may be determined from one or more sensors positioned to detect the position of the user's gaze within the head mounted display device 150. In alternative embodiments, supplemental information is positioned within the display without regard to the user's eye position, but relative to the position of objects within the user's field of view as determined by the user's position and the head orientation information provided.

At 540, a view model of the user's field of view is constructed using the information on the user's location and head position and orientation. The view model is constructed in accordance with the teachings of U.S. patent application Ser. No. 12/905,952, Entitled FUSING VIRTUAL CONTENT INTO REAL CONTENT, inventors Jason Flaks, Avi Bar-Zeev, Jeffrey Neil Margolis, Chris Miles, Alex Aben-Athar Kipman, Andrew John Fuller, and Bob Crocco Jr., filed Oct. 15, 2010, and U.S. patent application Ser. No. 12/970,695 filed Dec. 16, 2010, entitled, COMPREHENSION AND INTENT-BASED CONTENT FOR AUGMENTED REALITY DISPLAYS, inventors Katie Stone Perez, Avi Bar-Zeev, Sagi Katz both of which are specifically incorporated by reference herein. The view model allows the supplemental information provider to determine which objects might appear in a user's field of view, where the objects would appear relative to the user's view through the display device 150, and where on the display field 152 to place supplemental information during the live event.

In an alternative embodiment, each object or actor in a live event may be provided with a tracking token to allow the technology to identify the object within a scene. Tracking tokens may be reflective devices, electronic devices, or any device capable or optical, electrical or audio detection which identifies the object to allow supplemental information for the object to be matched to the object in the scene.

Once the view model is constructed, the view model is applied to the scene information at 550. Applying the view model to the scene includes identifying those objects which are detected or likely to be in the scene within field of view of the user at a given time. For example, for a given live event and a given user perspective, the view model may include one or more actors present on a stage, and the supplemental information may include information that at this point in the live event, the actors should be two specific characters in the play speaking certain dialog. The view model can be used to determine the placement of supplemental information regarding the objects detected in the user field of view based on the detected objects and the supplemental information. Time sequenced events map the running time of a performance to likely appearance of the objects within the event. For example, it is known that during a particular performance of a particular play or opera certain characters will appear on the stage. An indication can be made to the server to model the object in a manner which identifies the anticipated position of the object in the known view of the user given the orientation of the user and the position of the user relative to the objects. In such cases, movement of the object, appearance of the object and where supplemental information should be displayed relative to the object, can be performed in advance of the appearance of the object within the live event. Once the object does appear, the processing required will simply be to identify the object and apply the supplemental information to the display.

FIG. 6 is a method for mapping real time information to view data in accordance with the present technology. Using the applied view model, supplemental information can be mapped to the objects in the scene of a user's field of view.

At step 602, supplemental information applicable to the live event is retrieved. The supplemental information can be associated with the event in advance of the event as discussed above. Supplemental information may be sequenced to the time sequence of the event, or may be provided in a set of data which is likely to be utilized within the event, such as with sporting events. Where synchronization of the data to the event is provided, the real time synchronization of the data is accessed at 604. Even with quasi-random events, such as sporting events, certain types of information will be needed at certain times and the start time of the event is generally known. Once the event has started, the likelihood that certain types of information will occur at different times during the event can be predicted. This information could be a list to provide certain types of information at certain times. For each user view of an event at 606, identified objects and people through the user view are matched at 608. The supplemental information for the matched objects and people is retrieved at 612 and supplemental information for objects in the live view is matched to the determined objects within a scene in the user's field of view at 614.

Matching information to objects at 614 may be performed by a human director or by a display application constructed to apply display rules to the supplemental information and the objects. For example, when a particular batter comes to the plate in a baseball game, information regarding that batter may be shown in the display. The content of the supplemental information displayed will depend on the director or the rules defined in the application.

If a determination is made to render the supplemental information, then at 616 the position on the display where the supplemental information should be rendered is determined. The supplemental information can be rendered at various positions on the display depending upon the type of application, the user's preferences, and other preferences. Once the position and information is determined, then at 618, supplemental information and display location information is output to the display device.

Optionally, at step 620, upcoming objects and data needed for display are determined. At step 622, steps 608, 612, 614, 616 and 618 are repeated for upcoming data which is likely to be needed in the display. Display information for objects likely to be needed in the user display at a future point in time may be determined based on a known script or ordered events in a semi-random live event. For example, where an upcoming scene includes a new character or scripted events, this supplemental information about the character or events can be sent to the display for use by the display in rendering the information when such objects are present in the scene. At 624, the upcoming data and object matching information is output to the display processor. It will be readily recognized that steps 620, 622 and 624 need not occur in one alternative embodiment. At 626, for next user view of the event, steps 606 onwards are repeated.

As indicated above at FIG. 4, at step 430 and 455 elements of the method illustrated at FIG. 906 may be performed by the information data provider, by a processing device associated with the display device 150, or by a combination of processing devices. In one embodiment, the determination of objects in a scene within the field of view of a user is performed by both an information provider and a processing device local to the display device 150. For example, object/information matching 614 and information position determination 616 can be performed at a processor associated with the display.

FIGS. 7A and 7B illustrate two alternatives for rendering event-relevant information based on a user view and application parameters when a change occurs. Steps 727 and 728 in FIG. 7A illustrate one embodiment of steps 445 in FIG. 4.

In FIG. 7A object movements are tracked at 727 and at step 728, if an object moves, then the object is identified at step 730. At 732, a determination is made as to where supplemental information which may be displayed for the object should be moved within the display field 152 of the user's view. The display field 152 is updated at 734.

In FIG. 7B, steps 747 and 748 illustrated another embodiment of steps 445 in FIG. 4. A user's head position is tracked at 747 and if a user's head moves at 748, then objects within the display are identified at 750. Objects may be identified using the view model and supplemental information indicating objects likely to be within the user's view (as in step 608). At a given time in a performance or game, the actors or players known to be on the stage or field may be determined. For example, on a stage or on a field, the players actually on the field may be known, but may not be within a user's field of view. At 752, a determination is made as to where supplemental information which may be displayed for the object should be moved within the display field 152 of the user's view. The display field 152 is updated at 754.

FIG. 8 illustrates a method of rendering event-relevant information based on user view and application parameters in accordance with step 460 of FIG. 4. At step 800, the supplemental information provided by the information provider for a scene is accessed. At step 802, if the display location within the display field is defined, then the pixels used for the supplemental information are identified at 814 and those elements of the display device 150 which are needed to activate the supplemental information on the display—the projector, opacity filter, etc. described below with respect to FIGS. 9-12 are identified at 816 and the supplemental information is displayed at 818.

If the display location within the display field 152 is not known at 802, then at 804, the view model is accessed and updated, as necessary, based on any change between the provision of the supplemental information on the model from the information provider and the rendering time on the display. At 806, the model is corrected for any changes in the user's point of view and a determination of the location of objects for which supplemental information is provide is made at 808. At 810, the location within the display field 152 where supplemental information should be displayed is determined. Step 810 may be performed in accordance with rules based on where types of supplemental information for different live evens should be displayed in a display field. At 812, the display position is added to the supplemental information and at 814, the method continues as described above.

Figure 9:
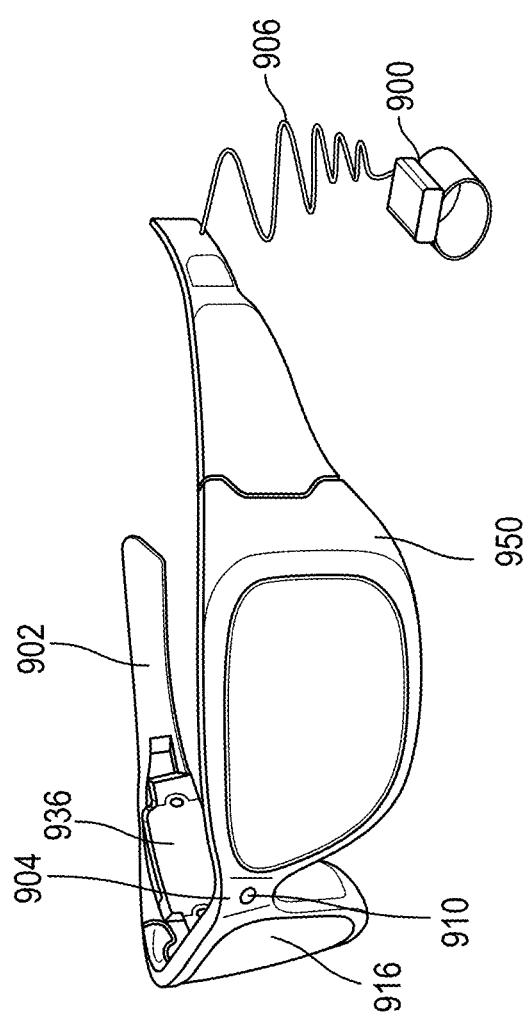
FIG. 9 is a perspective view of a head mounted display suitable for use in accordance with the present technology.

FIG. 9 is a perspective diagram depicting example components of one embodiment of a system 10 for fusing virtual content into real content. System 10 includes head mounted display device 150 in communication with processing unit 900 via wire 906. In other embodiments, head mounted display device 150 communicates with processing unit 900 via wireless communication. Head mounted display device 150, which in one embodiment is in the shape of glasses, is worn on the head of a user so that the user can see through a display and thereby have an actual direct view of the space in front of the user. The use of the term "actual and direct view" refers to the ability to see the real world objects directly with the human eye, rather than seeing created image representations of the objects. For example, looking through glass at a room allows a user to have an actual direct view of the room, while viewing a video of a room on a television is not an actual direct view of the room. More details of the head mounted display device 150 are provided below.

In one embodiment, processing unit 900 is worn on the user's wrist and includes much of the computing power used to operate head mounted display device 150. Processing unit 900 may also communicate wirelessly (e.g., WiFi, Bluetooth, infra-red, or other wireless communication means) to one other processing devices to implement the present technology.

Figure 10:
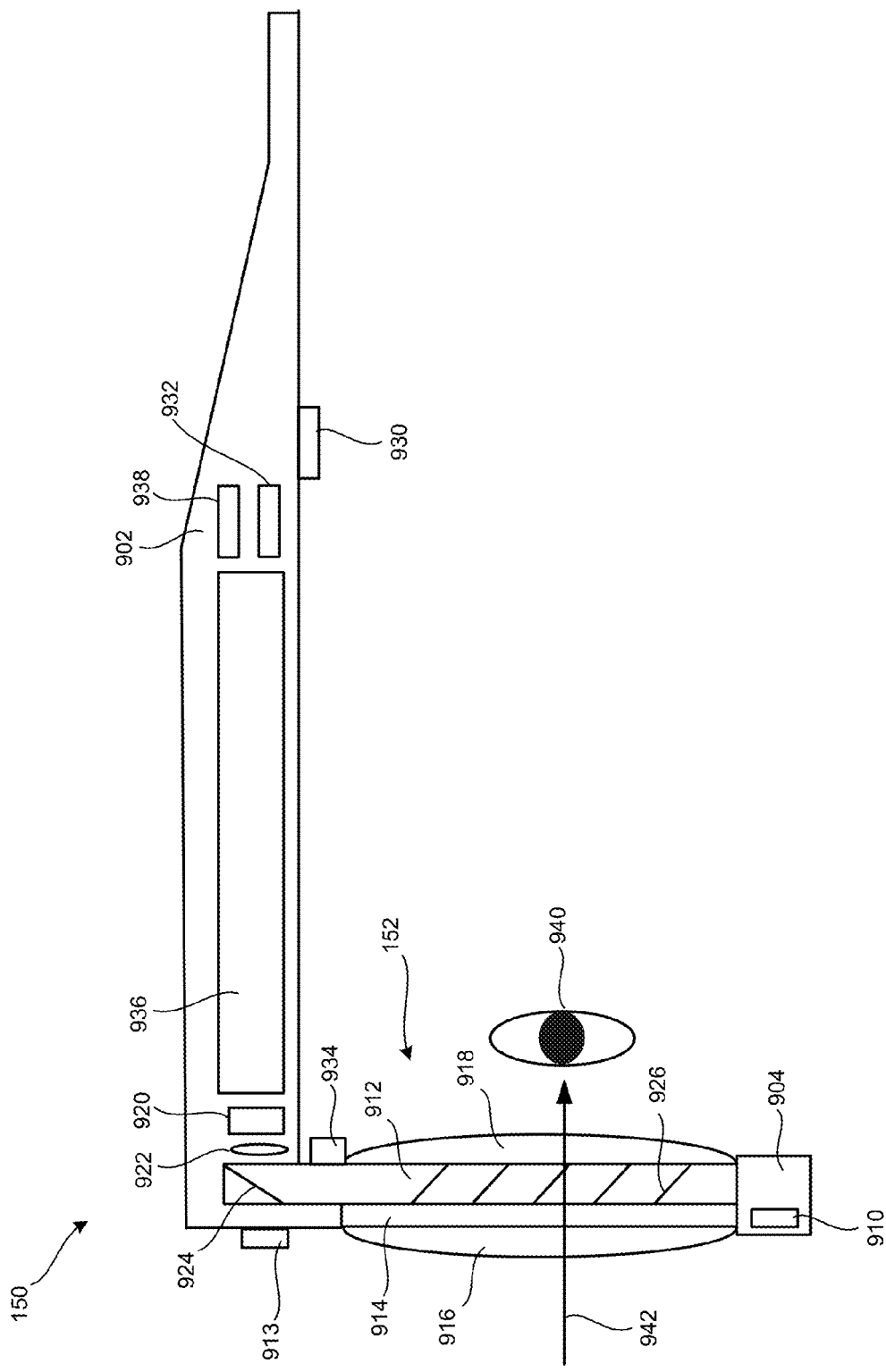
FIG. 10 is a top, partial view of the head mounted display shown in FIG. 9.

FIG. 10 depicts a top view of a portion of head mounted display device 950, including a portion of the frame that includes temple 902 and nose bridge 904. Only the right side of head mounted display device 950 is depicted. Built into nose bridge 904 is a microphone 910 for recording sounds and transmitting that audio data to processing unit 900, as described below. At the front of head mounted display device 150 is room facing video camera 913 that can capture video and still images. Those images are transmitted to processing unit 900, as described below.

A portion of the frame of head mounted display device 150 will surround a display (that includes one or more lenses). In order to show the components of head mounted display device 150, a portion of the frame surrounding the display is not depicted. The display includes a light guide optical element 912, opacity filter 914, see-through lens 916 and see-through lens 918. In one embodiment, opacity filter 914 is behind and aligned with see-through lens 916, lightguide optical element 912 is behind and aligned with opacity filter 914, and see-through lens 918 is behind and aligned with lightguide optical element 912. See-through lenses 916 and 918 are standard lenses used in eye glasses and can be made to any prescription (including no prescription). In one embodiment, see-through lenses 916 and 918 can be replaced by a variable prescription lens. In some embodiments, head mounted display device 150 will include only one see-through lens or no see-through lenses. In another alternative, a prescription lens can go inside lightguide optical element 912. Opacity filter 914 filters out natural light (either on a per pixel basis or uniformly) to enhance the contrast of the virtual imagery. Lightguide optical element 912 channels artificial light to the eye. More detailed of opacity filter 914 and lightguide optical element 912 is provided below.

Mounted to or inside temple 902 is an image source, which (in one embodiment) includes microdisplay 920 for projecting a virtual image and lens 922 for directing images from microdisplay 920 into lightguide optical element 912. In one embodiment, lens 922 is a collimating lens.

Control circuits 936 provide various electronics that support the other components of head mounted display device 150. More details of control circuits 936 are provided below with respect to FIG. 11. Inside, or mounted to temple 902, are ear phones 930, inertial sensors 932 and temperature sensor 938. In one embodiment inertial sensors 932 include a three axis magnetometer 932A, three axis gyro 932B and three axis accelerometer 932C (See FIG. 11). The inertial sensors are for sensing position, orientation, and sudden accelerations of head mounted display device 950.

Microdisplay 920 projects an image through lens 922. There are different image generation technologies that can be used to implement microdisplay 920. For example, microdisplay 920 can be implemented in using a transmissive projection technology where the light source is modulated by optically active material, backlit with white light. These technologies are usually implemented using LCD type displays with powerful backlights and high optical energy densities. Microdisplay 920 can also be implemented using a reflective technology for which external light is reflected and modulated by an optically active material. The illumination is forward lit by either a white source or RGB source, depending on the technology. Digital light processing (DGP), liquid crystal on silicon (LCOS) and Mirasol® display technology from Qualcomm, inc. are all examples of reflective technologies which are efficient as most energy is reflected away from the modulated structure and may be used in the system described herein. Additionally, microdisplay 920 can be implemented using an emissive technology where light is generated by the display. For example, a PicoP™ display engine from Microvision, Inc. emits a laser signal with a micro mirror steering either onto a tiny screen that acts as a transmissive element or beamed directly into the eye (e.g., laser).

Lightguide optical element 912 transmits light from microdisplay 920 to the eye 940 of the user wearing head mounted display device 150. Lightguide optical element 912 also allows light from in front of the head mounted display device 150 to be transmitted through lightguide optical element 912 to eye 940, as depicted by arrow 942, thereby allowing the user to have an actual direct view of the space in front of head mounted display device 950 in addition to receiving a virtual image from microdisplay 920. Thus, the walls of lightguide optical element 912 are see-through. Lightguide optical element 912 includes a first reflecting surface 924 (e.g., a mirror or other surface). Light from microdisplay 920 passes through lens 922 and becomes incident on reflecting surface 924. The reflecting surface 924 reflects the incident light from the microdisplay 920 such that light is trapped inside a planar, substrate comprising lightguide optical element 912 by internal reflection. After several reflections off the surfaces of the substrate, the trapped light waves reach an array of selectively reflecting surfaces 926. Note that only one of the five surfaces is labeled 926 to prevent over-crowding of the drawing. Reflecting surfaces 926 couple the light waves incident upon those reflecting surfaces out of the substrate into the eye 940 of the user. As different light rays will travel and bounce off the inside of the substrate at different angles, the different rays will hit the various reflecting surface 926 at different angles. Therefore, different light rays will be reflected out of the substrate by different ones of the reflecting surfaces. The selection of which light rays will be reflected out of the substrate by which surface 926 is engineered by selecting an appropriate angle of the surfaces 926. More details of a lightguide optical element can be found in United States Patent Application Publication 2008/0285140, Ser. No. 92/214,366, published on Nov. 20, 2008, "Substrate-Guided Optical Devices" incorporated herein by reference in its entirety. In one embodiment, each eye will have its own lightguide optical element 912. When the head mounted display device has two light guide optical elements, each eye can have its own microdisplay 920 that can display the same image in both eyes or different images in the two eyes. In another embodiment, there can be one lightguide optical element which reflects light into both eyes.

Opacity filter 914, which is aligned with lightguide optical element 912, selectively blocks natural light, either uniformly or on a per-pixel basis, from passing through lightguide optical element 912. In one embodiment, the opacity filter can be a see-through LCD panel, electrochromic film, or similar device which is capable of serving as an opacity filter. Such a see-through LCD panel can be obtained by removing various layers of substrate, backlight and diffusers from a conventional LCD. The LCD panel can include one or more light-transmissive LCD chips which allow light to pass through the liquid crystal. Such chips are used in LCD projectors, for instance.

Opacity filter 914 can include a dense grid of pixels, where the light transmissivity of each pixel is individually controllable between minimum and maximum transmissivities. While a transmissivity range of 0-100% is ideal, more limited ranges are also acceptable. As an example, a monochrome LCD panel with no more than two polarizing filters is sufficient to provide an opacity range of about 50% to 90% per pixel, up to the resolution of the LCD. At the minimum of 50%, the lens will have a slightly tinted appearance, which is tolerable. 100% transmissivity represents a perfectly clear lens. An "alpha" scale can be defined from 0-100%, where 0% allows no light to pass and 100% allows all light to pass. The value of alpha can be set for each pixel by the opacity filter control circuit 224 described below.

More details of an opacity filter are provided in U.S. patent application Ser. No. 92/887,426, "Opacity Filter For See-Through Mounted Display," filed on Sep. 21, 2010, incorporated herein by reference in its entirety.

In one embodiment, the display and the opacity filter are rendered simultaneously and are calibrated to a user's precise position in space to compensate for angle-offset issues. Eye tracking can be employed to compute the correct image offset at the extremities of the viewing field. In some embodiments, a temporal or spatial fade in the amount of opacity can be used in the opacity filter. Similarly, a temporal or spatial fade in the virtual image can be used. In one approach, a temporal fade in the amount of opacity of the opacity filter corresponds to a temporal fade in the virtual image. In another approach, a spatial fade in the amount of opacity of the opacity filter corresponds to a spatial fade in the virtual image.

In one example approach, an increased opacity is provided for the pixels of the opacity filter which are behind the virtual image, from the perspective of the identified location of the user's eye. In this manner, the pixels behind the virtual image are darkened so that light from a corresponding portion of the real world scene is blocked from reaching the user's eyes. This allows the virtual image to be realistic and represent a full range of colors and intensities. Moreover, power consumption by the augmented reality emitter is reduced since the virtual image can be provided at a lower intensity. Without the opacity filter, the virtual image would need to be provided at a sufficiently high intensity which is brighter than the corresponding portion of the real world scene, for the virtual image to be distinct and not transparent. In darkening the pixels of the opacity filter, generally, the pixels which follow the closed perimeter of virtual image are darkened, along with pixels within the perimeter. It can be desirable to provide some overlap so that some pixels which are just outside the perimeter and surround the perimeter are also darkened (at the same level of darkness or less dark than pixels inside the perimeter). These pixels just outside the perimeter can provide a fade (e.g., a gradual transition in opacity) from the darkness inside the perimeter to full amount of opacity outside the perimeter.

Head mounted display device 150 also includes a system for tracking the position of the user's eyes. As will be explained below, the system will track the user's position and orientation so that the system can determine the field of view of the user. However, a human will not perceive everything in front of them. Instead, a user's eyes will be directed at a subset of the environment. Therefore, in one embodiment, the system will include technology for tracking the position of the user's eyes in order to refine the measurement of the field of view of the user. For example, head mounted display device 150 includes eye tracking assembly 934 (see FIG. 10), which will include an eye tracking illumination device 934A and eye tracking camera 934B (see FIG. 11). In one embodiment, eye tracking illumination source 934A includes one or more infrared (IR) emitters, which emit IR light toward the eye. Eye tracking camera 934B includes one or more cameras that sense the reflected IR light. The position of the pupil can be identified by known imaging techniques which is detect the reflection of the cornea. For example, see U.S. Pat. No. 7,401,920, entitled "Head Mounted Eye Tracking and Display System", issued Jul. 22, 2008 to Kranz et al., incorporated herein by reference. Such a technique can locate a position of the center of the eye relative to the tracking camera. Generally, eye tracking involves obtaining an image of the eye and using computer vision techniques to determine the location of the pupil within the eye socket. In one embodiment, it is sufficient to track the location of one eye since the eye usually moves in unison. However, it is possible to track each eye separately.

In one embodiment, the system will use four IR LEDs and four IR photo detectors in rectangular or asymmetrical arrangement so that there is one IR LED and IR photo detector at each corner of the lens of head mounted display device 950. Light from the LEDs reflect off the eyes. The amount of infrared light detected at each of the four IR photo detectors determines the pupil direction. That is, the amount of white versus black in the eye will determine the amount of light reflected off the eye for that particular photo detector. Thus, the photo detector will have a measure of the amount of white or black in the eye. From the four samples, the system can determine the direction of the eye.

Another alternative is to use four infrared LEDs as discussed above, but only one infrared CCD on the side of the lens of head mounted display device 150. The CCD will use a small mirror and/or lens (fish eye) such that the CCD can image up to 75% of the visible eye from the glasses frame. The CCD will then sense an image and use computer vision to find the image, much like as discussed above. Thus, although FIG. 10 shows one assembly with one IR emitter, the structure of FIG. 10 can be adjusted to have four IR transmitters and/or four IR sensors. More or less than four IR transmitters and/or four IR sensors can also be used.

Another embodiment for tracking the direction of the eyes is based on charge tracking. This concept is based on the observation that a retina carries a measurable positive charge and the cornea has a negative charge. Sensors are mounted by the user's ears (near earphones 930) to detect the electrical potential while the eyes move around and effectively read out what the eyes are doing in real time. Other embodiments for tracking eyes can also be used.

FIG. 10 only shows half of the head mounted display device 150. A full head mounted display device would include another set of see through lenses, another opacity filter, another lightguide optical element, another microdisplay 920, another lens 922, room facing camera, eye tracking assembly, microdisplay, earphones, and temperature sensor.

Figure 11:
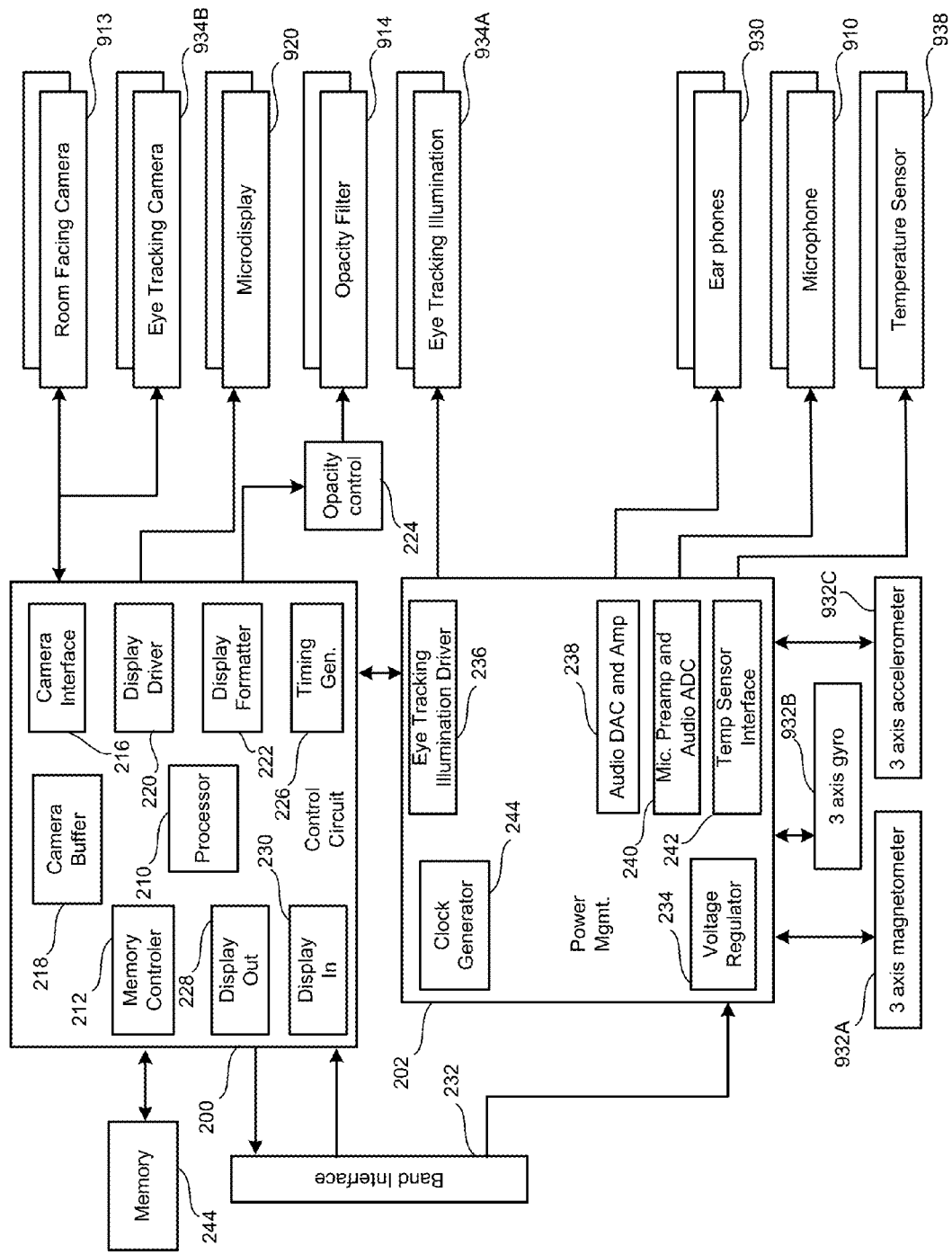
FIG. 11 is a block diagram of the processing components of the head mounted display shown in FIGS. 9 and 10.

FIG. 11 is a block diagram depicting the various components of head mounted display device 150. FIG. 11 is a block diagram describing the various components of processing unit 900. Head mounted display device 150, the components of which are depicted in FIG. 10, are used to provide supplemental information to the user by fusing that information with the user's view of the real world. Additionally, the head mounted display device components of FIG. 10 include many sensors that track various conditions. Head mounted display device 150 will receive instructions about the virtual image from processing unit 900 and will provide the sensor information back to processing unit 900. Processing unit 900, the components of which are depicted in FIG. 11, will receive the sensory information from head mounted display device 150 and also from information provider 30 (see FIG. 3). Based on that information, processing unit 900 will determine where and when to provide a virtual image to the user and send instructions accordingly to the head mounted display device 150.

Note that some of the components of FIG. 11 (e.g., rear facing camera 913, eye tracking camera 934B, micro display 920, opacity filter 914, eye tracking illumination 934A, earphones 930, and temperature sensor 938) are shown in shadow to indicate that there are two of each of those devices, one for the left side and one for the right side of head mounted display device 150. FIG. 11 shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 200 are in communication with each other via a dedicated lines or one or more buses. In another embodiment, each of the components of control circuit 200 are in communication with processor 210. Camera interface 216 provides an interface to the two room facing cameras 913 and stores images received from the room facing cameras in camera buffer 218. Display driver 220 will drive microdisplay 920. Display formatter 222 provides information, about the virtual image being displayed on microdisplay 920, to opacity control circuit 224, which controls opacity filter 914. Timing generator 226 is used to provide timing data for the system. Display out interface 228 is a buffer for providing images from room facing cameras 913 to the processing unit 900. Display in 230 is a buffer for receiving images such as a virtual image to be displayed on microdisplay 120. Display out 228 and display in 230 communicate with band interface 232 which is an interface to processing unit 900.

Power management circuit 202 includes voltage regulator 234, eye tracking illumination driver 236, audio DAC and amplifier 238, microphone preamplifier audio ADC 240, temperature sensor interface 242 and clock generator 244. Voltage regulator 234 receives power from processing unit 900 via band interface 232 and provides that power to the other components of head mounted display device 2. Eye tracking illumination driver 236 provides the IR lightsource for eye tracking illumination 134A, as described above. Audio DAC and amplifier 238 receives the audio information from earphones 130. Microphone preamplifier and audio ADC 240 provides an interface for microphone 110. Temperature sensor interface 242 is an interface for temperature sensor 138. Power management unit 202 also provides power and receives data back from three axis magnetometer 132A, three axis gyro 132B and three axis accelerometer 132C.

Figure 12:
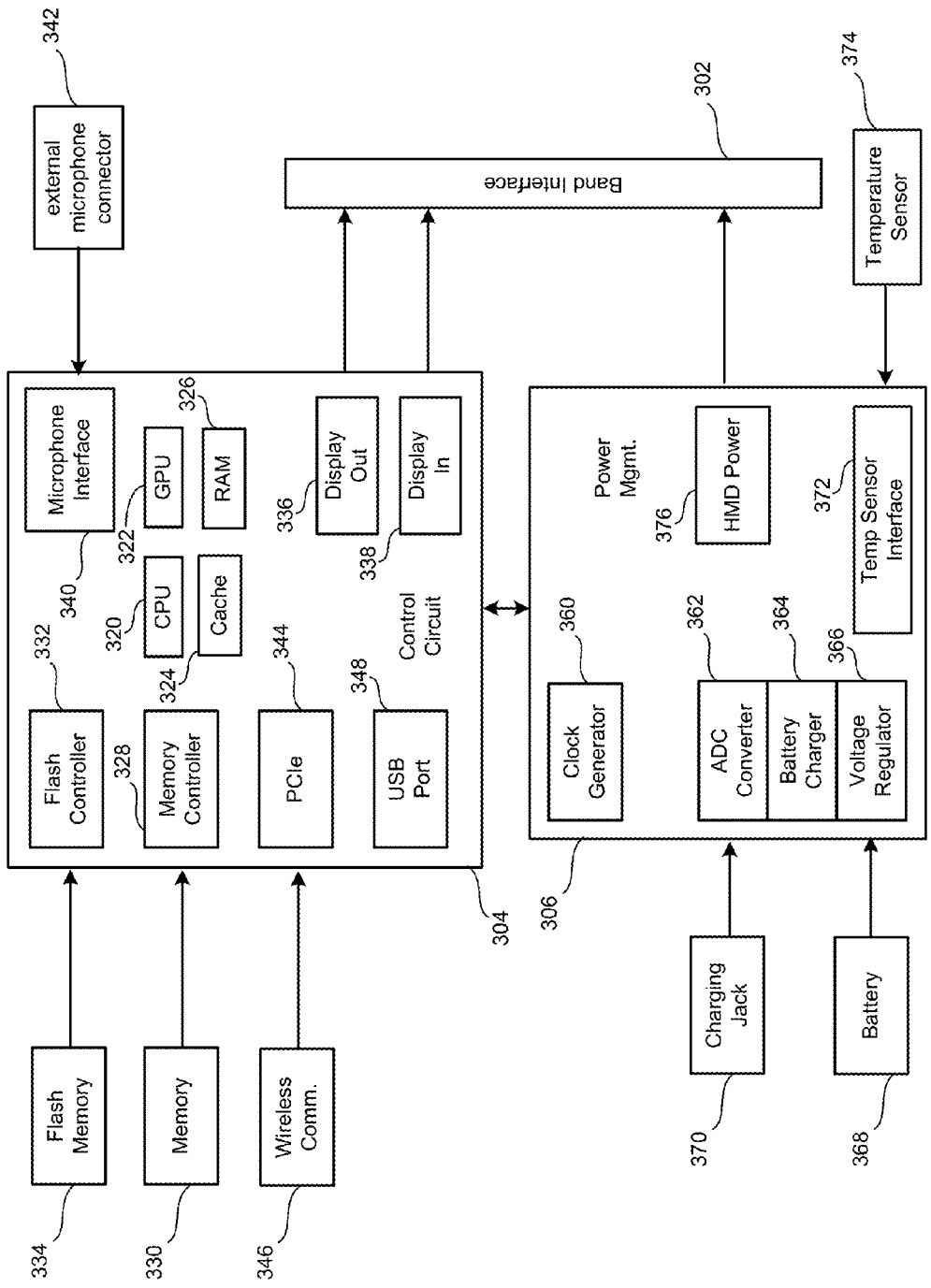
FIG. 12 is a block diagram of the processor shown in FIG. 11.

FIG. 12 is a block diagram describing the various components of processing unit 900. FIG. 12 shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with head mounted display device 950 via band interface 302 and band interface 232, display in buffer 338 in communication with head mounted display device 950 via band interface 302 and band interface 232, microphone interface 340 in communication with an external microphone connector 342 for connecting to a microphone, PCI express interface for connecting to a wireless communication device 346, and USB port(s) 348. In one embodiment, wireless communication device 346 can include a Wi-Fi enabled communication device, BlueTooth communication device, infrared communication device, etc.

Power management circuit 306 includes clock generator 360, analog to digital converter 362, battery charger 364, voltage regulator 366, head mounted display power source 376, and temperature sensor interface 372 in communication with temperature sensor 374 (located on the wrist band of processing unit 900). Analog to digital converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. HMD power source 376 provides power to the head mounted display device 950.

The above-described system will be configured to insert supplemental information into the field of view of a user. In one example embodiment a model of the environment that the user is in is created and the various moving objects in that environment are tracked. Sensor information obtained by head mounted display device 150 is transmitted to processing unit 900. Processing unit 900 then uses additional sensor information it receives from head mounted display device 150 to refine the field of view of the user and provide instructions to head mounted display device 150 on how, where and when to insert the virtual image.

Figure 13:
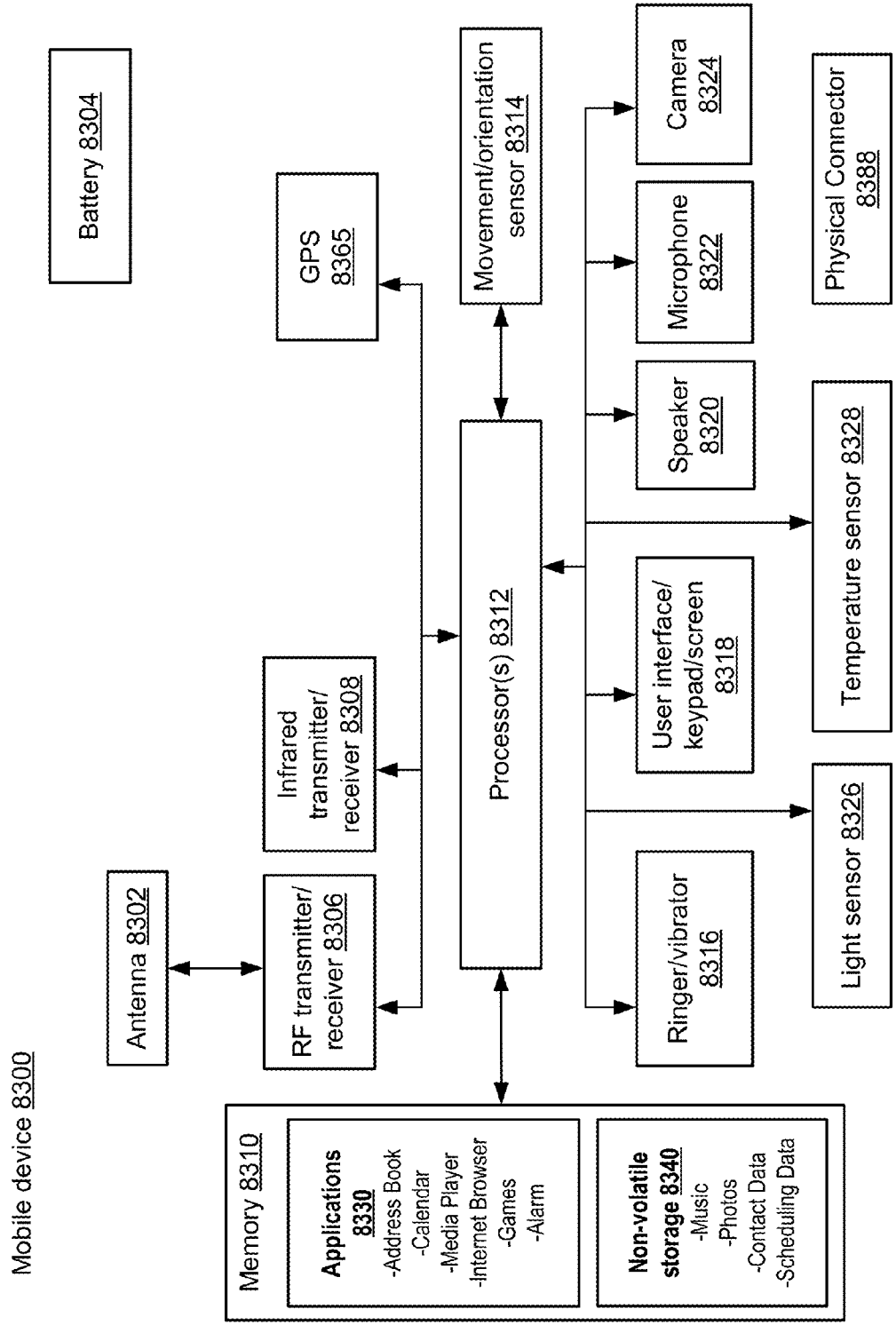
FIG. 13 is a depiction of a mobile device suitable for use in accordance with the present technology.

FIG. 13 is a block diagram of one embodiment of a mobile device 8300. The mobile device may be utilized in one embodiment as the processing device 900 for the display apparatus 150. Mobile devices may include laptop computers, pocket computers, mobile phones, personal digital assistants, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. The data connection allows for operations such as synchronizing mobile device data with the computing data on another device.

Figure 14:
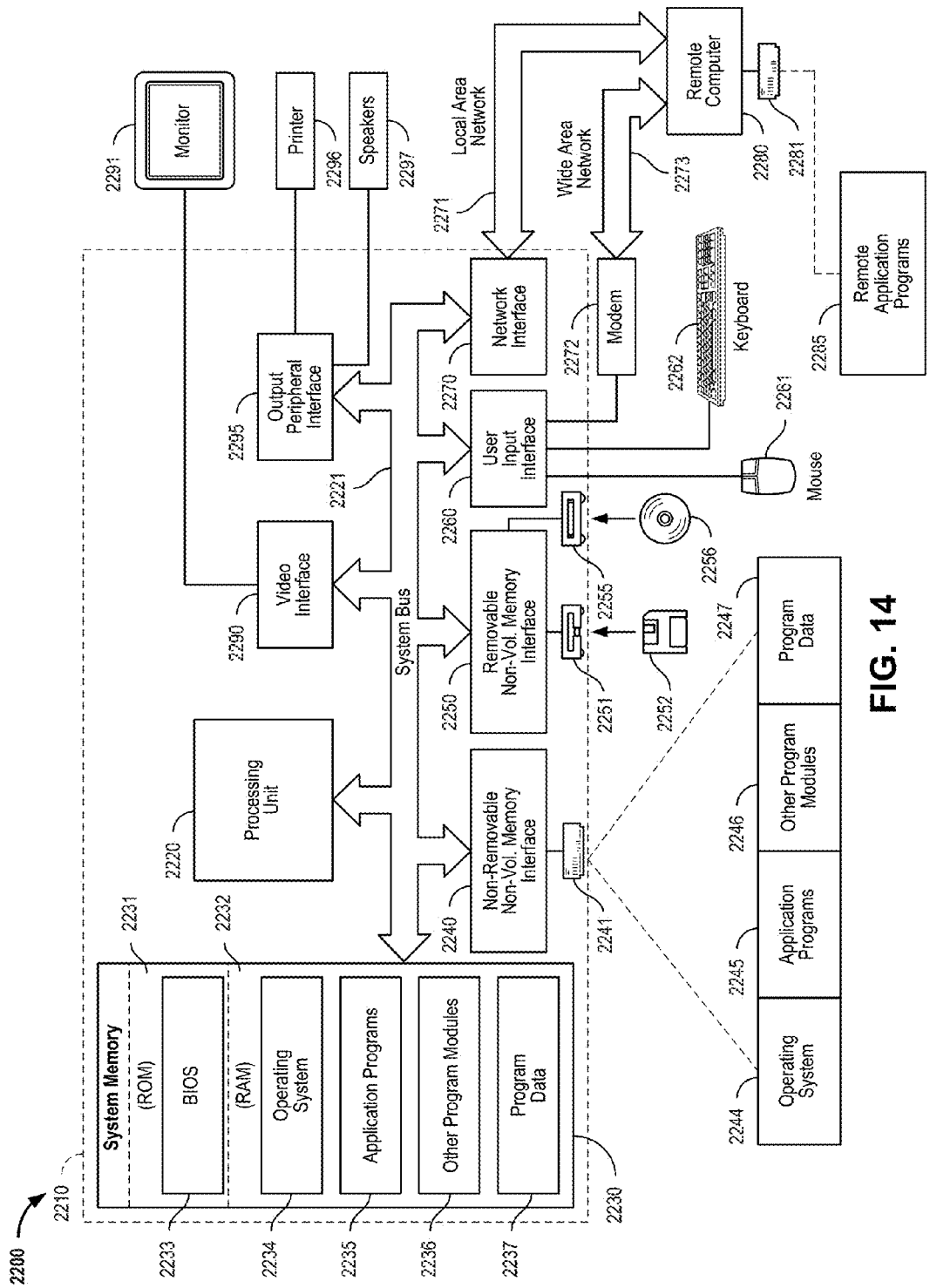
FIG. 14 is a block diagram of a processing device suitable for use in accordance with the present technology.

FIG. 14 is a block diagram of an embodiment of a computing system environment 2200. The computing environment 2200 may be employed as the processing device 900 for the display device 150, or by the information providers 30, 90 in performing the processes described herein. Computing system environment 2200 includes a general purpose computing device in the form of a computer 2210. Components of computer 2210 may include, but are not limited to, a processing unit 2220, a system memory 2230, and a system bus 2221 that couples various system components including the system memory 2230 to the processing unit 2220. The system bus 2221 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 2210 typically includes a variety of computer readable media. Computer readable media can be any available media that can be accessed by computer 2210 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 2210. Combinations of the any of the above should also be included within the scope of computer readable media.

The system memory 2230 includes computer storage media in the form of volatile and/or nonvolatile memory such as read only memory (ROM) 2231 and random access memory (RAM) 2232. A basic input/output system 2233 (BIOS), containing the basic routines that help to transfer information between elements within computer 2210, such as during start-up, is typically stored in ROM 2231. RAM 2232 typically contains data and/or program modules that are immediately accessible to and/or presently being operated on by processing unit 2220. By way of example, and not limitation, FIG. 14 illustrates operating system 2234, application programs 2235, other program modules 2236, and program data 2237.

The computer 2210 may also include other removable/non-removable, volatile/nonvolatile computer storage media. By way of example only, FIG. 14 illustrates a hard disk drive 2241 that reads from or writes to non-removable, nonvolatile magnetic media, a magnetic disk drive 2251 that reads from or writes to a removable, nonvolatile magnetic disk 2252, and an optical disk drive 2255 that reads from or writes to a removable, nonvolatile optical disk 2256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2241 is typically connected to the system bus 2221 through an non-removable memory interface such as interface 2240, and magnetic disk drive 2251 and optical disk drive 2255 are typically connected to the system bus 2221 by a removable memory interface, such as interface 2250.

The drives and their associated computer storage media discussed above and illustrated in FIG. 14, provide storage of computer readable instructions, data structures, program modules and other data for the computer 2210. In FIG. 14, for example, hard disk drive 2241 is illustrated as storing operating system 2244, application programs 2245, other program modules 2246, and program data 2247. Note that these components can either be the same as or different from operating system 2234, application programs 2235, other program modules 2236, and program data 2237. Operating system 2244, application programs 2245, other program modules 2246, and program data 2247 are given different numbers here to illustrate that, at a minimum, they are different copies. A user may enter commands and information into computer 2210 through input devices such as a keyboard 2262 and pointing device 2261, commonly referred to as a mouse, trackball, or touch pad. Other input devices (not shown) may include a microphone, joystick, game pad, satellite dish, scanner, or the like. These and other input devices are often connected to the processing unit 2220 through a user input interface 2260 that is coupled to the system bus, but may be connected by other interface and bus structures, such as a parallel port, game port or a universal serial bus (USB). A monitor 2291 or other type of display device is also connected to the system bus 2221 via an interface, such as a video interface 2290. In addition to the monitor, computers may also include other peripheral output devices such as speakers 2297 and printer 2296, which may be connected through an output peripheral interface 2295.

The computer 2210 may operate in a networked environment using logical connections to one or more remote computers, such as a remote computer 2280. The remote computer 2280 may be a personal computer, a server, a router, a network PC, a peer device or other common network node, and typically includes many or all of the elements described above relative to the computer 2210, although only a memory storage device 2281 has been illustrated in FIG. 14. The logical connections depicted in FIG. 14 include a local area network (LAN) 2271 and a wide area network (WAN) 2273, but may also include other networks. Such networking environments are commonplace in offices, enterprise-wide computer networks, intranets and the Internet.

When used in a LAN networking environment, the computer 2210 is connected to the LAN 2271 through a network interface or adapter 2270. When used in a WAN networking environment, the computer 2210 typically includes a modem 2272 or other means for establishing communications over the WAN 2273, such as the Internet. The modem 2272, which may be internal or external, may be connected to the system bus 2221 via the user input interface 2260, or other appropriate mechanism. In a networked environment, program modules depicted relative to the computer 2210, or portions thereof, may be stored in the remote memory storage device. By way of example, and not limitation, FIG. 14 illustrates remote application programs 2285 as residing on memory device 2281. It will be appreciated that the network connections shown are exemplary and other means of establishing a communications link between the computers may be used.

The disclosed technology is operational with numerous other general purpose or special purpose computing system environments or configurations. Examples of well-known computing systems, environments, and/or configurations that may be suitable for use with the technology include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosed technology may be described in the general context of computer-executable instructions, such as program modules, being executed by a computer. Generally, software and program modules as described herein include routines, programs, objects, components, data structures, and other types of structures that perform particular tasks or implement particular abstract data types. Hardware or combinations of hardware and software may be substituted for software modules as described herein.

The disclosed technology may also be practiced in distributed computing environments where tasks are performed by remote processing devices that are linked through a communications network. In a distributed computing environment, program modules may be located in both local and remote computer storage media including memory storage devices.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer readable hardware storage devices storing processor executable instructions for causing one or more data processing devices to carry out a method for providing real time augmentation information for a live event having at least portions thereof viewable by way of one or more event viewing devices so that the live event is viewable in real time by a user with aid of a reality augmenting system, where the live event has a finite event duration, the method comprising:

receiving an indication that the user is gazing at an
       in-view real time viewable portion of the live event, the real time viewable portion being present during the finite event duration of the live event;

while the user is indicated to be gazing at the in-view real time viewable portion of the live event, automatically determining at least one of likely next viewable fields of real time viewing of the live event that will be next gaze-able at by the user and identifying one or more real objects of the event that are expected to be present within the determined at least one of likely next viewable fields;

retrieving corresponding items of supplemental information describing at least a portion of one or more of the identified real objects expected to be present in the determined at least one of likely next viewable fields;

identifying corresponding virtual display elements within which the retrieved and corresponding items of supplemental information can be potentially presented to the user by way of the reality augmenting system if the determined at least one of likely next viewable fields becomes a currently viewable field;

determining one or more relative positions within the determined at least one of likely next viewable fields for the identified virtual display elements to be potentially presented to the user; and in response to at least one of previously identified real objects coming to be present in a currently gaze-able at one of the predetermined likely next viewable fields, rendering at least part of the retrieved and corresponding items of supplemental information in a corresponding one or more of the pre-identified virtual display elements, where the rendered-to virtual display elements are positioned at their respectively pre-determined relative positions within the currently gaze-able at one of the predetermined likely next viewable fields, each rendered-to virtual display element being finally rendered at at least one of a position proximate to its corresponding identified real object that is present in the currently gaze-able at one of the predetermined likely next viewable fields and a position corresponding to a cue indicating a scripted part of the live event.

2. The one or more storage devices of claim 1 wherein within the carried out method:

said rendering of the supplemental information includes providing information regarding at least one of the identified real objects and/or an action in the live event in the currently gaze-able at one of the predetermined likely next viewable fields.

3. The one or more storage devices of claim 1 wherein within the carried out method:

said step of receiving an indication that the user is gazing includes detecting the user's location relative to the in-view real time viewable portion of the live event.

4. The one or more storage devices of claim 1 wherein within the carried out method:

said step of retrieving corresponding items of supplemental information includes retrieving supplemental information regarding scripted event portions likely to occur within scripted portions of the live event.

5. The one or more storage devices of claim 1 wherein within the carried out method:

said step of retrieving corresponding items of supplemental information includes retrieving supplemental information describing real objects likely to be in the in-view real time viewable portions of the live event at future portions of the live event.

6. The one or more storage devices of claim 1 wherein within the carried out method:

said steps of retrieving corresponding items of supplemental information and of determining one or more relative positions include receiving supplemental information and relative positions for the display elements transmitted from a remote source.

7. The one or more storage devices of claim 1 wherein within the carried out method:

said step of receiving an indication that the user is gazing is based on real time tracking of a location of the user and of an orientation of the user's head.

8. The one or more storage devices of claim 1 wherein within the carried out method:

said step of receiving an indication that the user is gazing is based on real time repetition of tracking of orientation of the user's head and of the user's eye gaze.

9. The one or more storage devices of claim 1 wherein the carried out method is carried out with use of:

a see-through head mounted display wearable by the user and having a display and a respective field of view;

a processor and code instructing the processor to perform steps of:

registering attendance of the user at the live event with an information provider;

detecting a current field of view of a real world scene directly viewable by the user through the see-through head mounted display and an apparatus position;

identifying real objects in the current field of view of the see-through head mounted display for which supplemental information is available during the event duration;

retrieving at least first supplemental information for the display based on the current field of view including supplemental information associated with real objects present in the current field of view of the see-through head mounted display;

retrieving second supplemental information describing other real objects likely to be in a possible future field of view of the see-through head mounted display at a corresponding future portion of the live event;

determining virtual display elements that are to host display of the first supplemental information and thereby to display the first supplemental information in the display of the head mounted display;

determining positions within the current field of view for the determined virtual display elements that are to be presented to the user the determined positions being configured to allow a see-through view of the real world object associated with supplemental information hosted in the virtual display elements;

responsive to the current field of view of the scene and the apparatus position being unchanged, displaying the first supplemental information in the display within the head mounted display while the user is viewing the real world objects in a see-through viewing manner during the live event with the current field of view of the scene and the apparatus position; and repeating at least the detecting and displaying steps based on one or more of the following:

upon movement of the user to define a new field of view;

upon a change in an occurrence in the live event to update information about a real object; and upon a change in the real objects present in the user's field of view.

10. The one or more storage devices of claim 9 wherein:

the code instructing the processor further includes code instructing the processor to retrieve additional supplemental information for the same field of view.

11. The one or more storage devices of claim 10 wherein:
the code instructing the processor further includes code associating the additional supplemental information with the real objects present in field of view of the see-through head mounted display.

12. The one or more storage devices of claim 9 wherein:
the supplemental information includes unscripted supplemental information provided for a semi-random live event.

13. The one or more storage devices of claim 9 wherein:
the code determining the display elements includes rules associating the supplemental information with actions and real objects in the live event.

14. The one or more storage devices of claim 9 wherein:
the determining includes providing additional data concerning known occurrences likely to occur at a future time within the live event.

15. A computational machine-system configured to present event-supplementing information to a user situated at and viewing real objects of a live event with aid of a head-worn reality augmenting sub-system, the live event having a finite event duration, the computational machine-system comprising:

a data source configured to provide supplemental information relevant to real objects within the user's potential field of view;

a user tracker configured to track at least one of a head orientation and eye gaze direction of the user who is situated at the live event;

an event detector configured to detect a start of the live event;

an event objects and actions presence detector configured to detect real time presence of real objects and actions in the live event during the event duration;

an information placement determinater configured to automatically determine where within the field of view of the user as presented by the head-worn reality augmenting sub-system, virtual display elements can be unobtrusively presented to the user as hosting the supplemental information, the determined positions being configured to allow the user to unobtrusively view the real world object associated with supplemental information.

* * * * *